United States Patent
Ito

(10) Patent No.: US 11,614,664 B2
(45) Date of Patent: Mar. 28, 2023

(54) ELECTRO-OPTICAL DEVICE, MANUFACTURING METHOD OF ELECTRO-OPTICAL DEVICE, AND ELECTRONIC APPARATUS

(71) Applicant: SEIKO EPSON CORPORATION, Tokyo (JP)

(72) Inventor: Satoshi Ito, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 140 days.

(21) Appl. No.: 17/076,792

(22) Filed: Oct. 21, 2020

(65) Prior Publication Data

US 2021/0124225 A1    Apr. 29, 2021

(30) Foreign Application Priority Data

Oct. 29, 2019    (JP) .............................. JP2019-196224

(51) Int. Cl.
G02F 1/1362    (2006.01)

(52) U.S. Cl.
CPC .. *G02F 1/136209* (2013.01); *G02F 1/136213* (2013.01)

(58) Field of Classification Search
None
See application file for complete search history.

(56) References Cited

U.S. PATENT DOCUMENTS

| 5,183,782 A | 2/1993 | Onishi et al. |
| 5,760,861 A * | 6/1998 | Kim .................. G02F 1/136209 430/7 |
| 2002/0036818 A1* | 3/2002 | Kawata ............. G02F 1/136209 359/254 |
| 2004/0001915 A1* | 1/2004 | He .......................... H01B 1/08 427/248.1 |
| 2004/0141097 A1* | 7/2004 | Takahara .......... G02F 1/136213 349/110 |
| 2006/0215269 A1* | 9/2006 | Abe ..................... G02B 3/0012 359/619 |
| 2019/0391453 A1 | 12/2019 | Ito |

FOREIGN PATENT DOCUMENTS

| JP | H05347272 | 12/1993 |
| JP | 2008225034 | 9/2008 |
| JP | 2018146870 | 9/2018 |
| JP | 2019219603 | 12/2019 |

* cited by examiner

*Primary Examiner* — Richard H Kim
(74) *Attorney, Agent, or Firm* — JCIPRNET

(57) ABSTRACT

An electro-optical device includes a first substrate including a plurality of pixel electrodes, a second substrate including a common electrode, and an electro-optical layer disposed between the plurality of pixel electrodes and the common electrode, optical characteristics of the electro-optical layer changing according to an electric field. One of the first substrate and the second substrate includes a base material composed of an inorganic material and having insulating and transmission properties, and a light shielding portion having light shielding properties and including a first film containing tungsten silicide, a second film containing titanium nitride or tungsten nitride, and a third film containing tungsten. The first film, the second film, and the third film are disposed in this order from the base material.

13 Claims, 10 Drawing Sheets

US 11,614,664 B2

ELECTRO-OPTICAL DEVICE, MANUFACTURING METHOD OF ELECTRO-OPTICAL DEVICE, AND ELECTRONIC APPARATUS

The present application is based on, and claims priority from JP Application Serial Number 2019-196224, filed Oct. 29, 2019, the disclosure of which is hereby incorporated by reference herein in its entirety.

BACKGROUND

1. Technical Field

The present disclosure relates to an electro-optical device, a manufacturing method of an electro-optical device, and an electronic apparatus.

2. Related Art

An electro-optical device, such as a liquid crystal device capable of changing optical characteristics for each of pixels, is generally used in an electronic apparatus, such as a projector. For example, in JP-A-2008-225034, a liquid crystal device is disclosed that is provided with a thin film transistor (TFT) array substrate on which a plurality of pixel electrodes are disposed, a counter substrate on which a counter electrode is disposed, and a liquid crystal layer disposed between the TFT array substrate and the counter substrate. Each of the TFT array substrate and the counter substrate is configured by quartz or glass.

Further, in JP-A-2008-225034, a light shielding film, an insulating film, and a TFT including a channel region are provided in this order between the TFT array substrate and the plurality of pixel electrodes. The light shielding film is configured by tungsten and shields the channel region of the TFT. Further, the light shielding film is adhered to the TFT array substrate by an adhesive layer made of titanium nitride.

However, when the light shielding film configured by tungsten is adhered to the TFT array substrate configured by quartz using the adhesive layer configured by titanium nitride, there is a risk that the light shielding film may peel off from the TFT array substrate when the light shielding film is manufactured. There is therefore demand for a light shielding film having excellent adhesion properties.

SUMMARY

An aspect of an electro-optical device according to the present disclosure includes a first substrate including a plurality of pixel electrodes, a second substrate including a common electrode, and an electro-optical layer disposed between the plurality of pixel electrodes and the common electrode, optical characteristics of the electro-optical layer changing according to an electric field. One of the first substrate and the second substrate includes a base material composed of an inorganic material and having insulating and transmission properties, and a light shielding portion having light shielding properties and including a first film containing tungsten silicide, a second film containing titanium nitride or tungsten nitride, and a third film containing tungsten. The first film, the second film, and the third film are disposed in this order from the base material, An aspect of a manufacturing method of an electro-optical device according to the present disclosure is a manufacturing method of an electro-optical device that includes a first substrate including a plurality of pixel electrodes, a second substrate including a common electrode, and an electro-optical layer disposed between the plurality of pixel electrodes and the common electrode, optical characteristics of the electro-optical layer changing according to an electric field. In manufacturing of the first substrate or the second substrate, the method includes preparing a base material composed of an inorganic material and having insulating and transmission properties, and forming a light shielding portion having light shielding properties and including a first film containing tungsten silicide, a second film containing one of titanium nitride and tungsten nitride, and a third film containing tungsten. The forming the light shielding portion includes forming the first film at the base material, forming the second film at the first film, and forming the third film at the second film.

DESCRIPTION OF EXEMPLARY EMBODIMENTS

Figure 1:
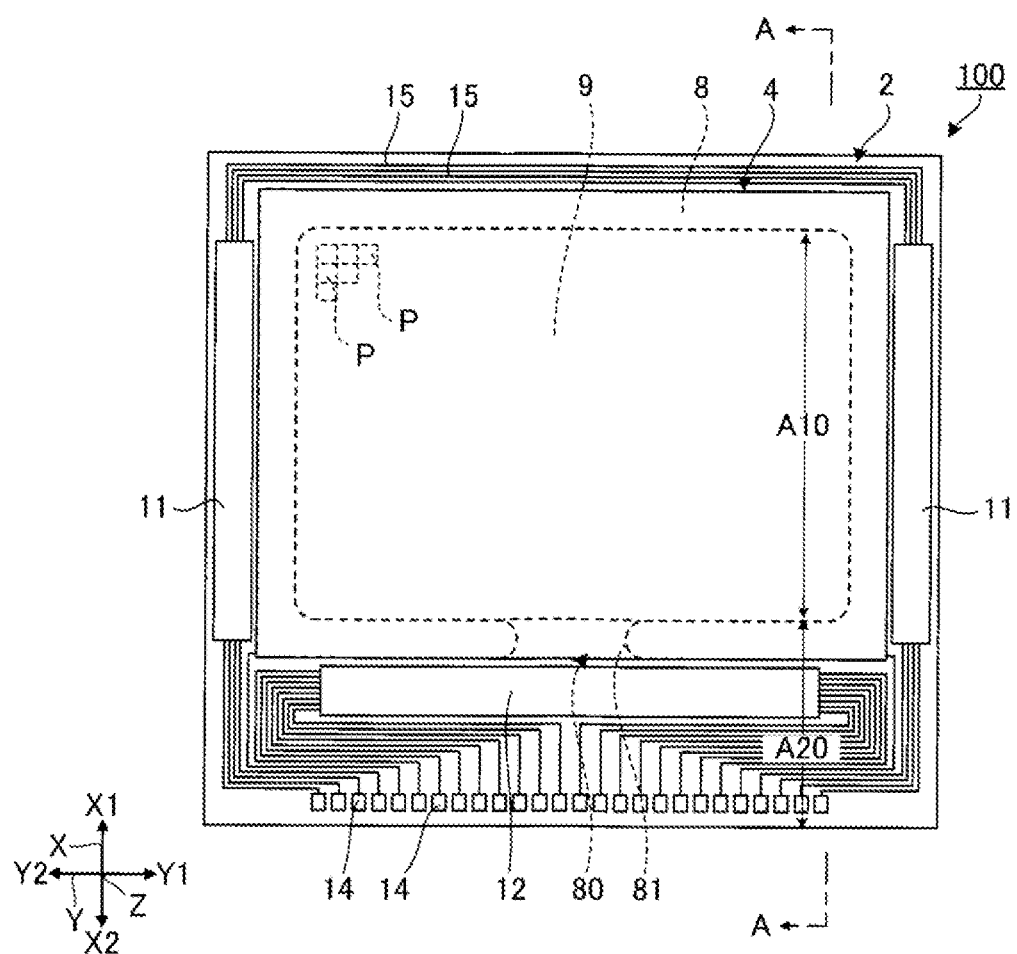
FIG. 1 is a plan view of an electro-optical device according to a first embodiment.

Preferred embodiments of the present disclosure will be described below with reference to the accompanying drawings. Note that, in the drawings, a dimension and scale of each of portions may differ from an actual dimension and scale as appropriate, and some of the portions are schematically illustrated for ease of understanding. Further, the scope of the present disclosure is not limited to these embodiments unless otherwise stated to limit the present disclosure in the following description. Further, an expression "an element B is disposed on an element A" is not limited to a configuration in which the element A and the element B are in direct contact. Configurations in which the element A and the element B are not in direct contact are also encompassed by the concept "the element B is disposed on the element A".

1. Electro-Optical Device

An active matrix liquid crystal device is described as an example of an electro-optical device of the present disclosure.

1A. First Embodiment 1A-1. Basic Configuration

Figure 2:
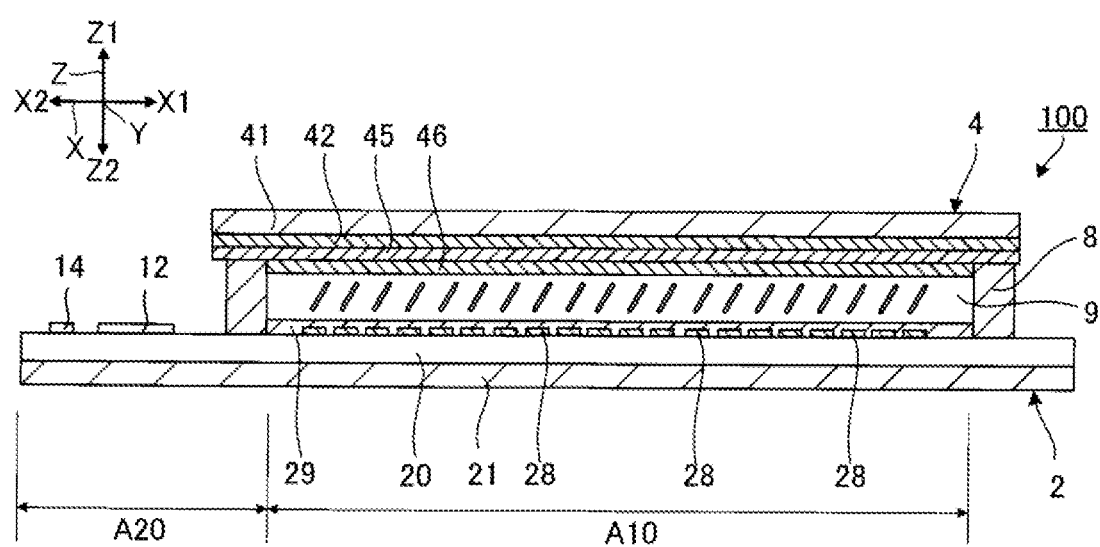
FIG. 2 is a cross-sectional view taken along a line A-A in FIG. 1.

FIG. 1 is a plan view of an electro-optical device 100 according to a first embodiment. FIG. 2 is a cross-sectional view taken along a line A-A in FIG. 1. Note that, for convenience of explanation, the description will be made as appropriate, using an X-axis, a Y-axis, and a Z-axis that are orthogonal to each other. Further, a direction to one side along the X-axis is referred to as a direction X1, and a direction opposite to the direction X1 is referred to as a direction X2. Similarly, a direction to one side along the Y-axis is referred to as a direction Y1, and the direction opposite to the direction Y1 is referred to as a direction Y2. A direction to one side along the Z-axis is referred to as a direction Z1, and the direction opposite to the direction Z1 is referred to as a direction Z2.

The liquid crystal display device 100 illustrated in FIG. 1 and FIG. 2 is a transmission-type liquid crystal device. As illustrated in FIG. 2, the electro-optical device 100 includes a transmissive element substrate 2, a transmissive counter substrate 4, a frame-shaped sealing member 8, and a liquid crystal layer 9. The element substrate 2 is an example of a "first substrate". The counter substrate 4 is an example of a "second substrate". The liquid crystal layer 9 is an example of an "electro-optical layer". The sealing member 8 is disposed between the element substrate 2 and the counter substrate 4. The liquid crystal layer 9 is disposed in a region surrounded by the element substrate 2, the counter substrate 4, and the sealing member 8. The element substrate 2, the liquid crystal layer 9, and the counter substrate 4 are aligned along the Z axis. The surface of a second base material 41, to be described below, provided on the counter substrate 4 is parallel to an X-Y plane. In the following, viewing from the direction Z1 or the direction Z2, which is the thickness direction of the element substrate 2, is referred to as "plan view".

In the electro-optical device 100 of the present embodiment, light is incident on the element substrate 2, for example, is transmitted through the liquid crystal layer 9 and is emitted from the counter substrate 4. Note that the light may be incident on the counter substrate 4, be transmitted through the liquid crystal layer 9, and be emitted from the element substrate 2. The light is visible light. "Transmissive" refers to the transmittance of visible light, and preferably refers to a transmittance of visible light of 50% or more. Further, the liquid crystal display device 100 illustrated in FIG. 1 has a rectangular shape in plan view, but the shape of the liquid crystal display device 100 in plan view is not limited to the rectangular shape and may be a round shape, or the like.

As illustrated in FIG. 2, the element substrate 2 includes a first base material 21, a wiring layer 20, a plurality of pixel electrodes 28, and a first oriented film 29. The first base material 21 is an example of a "base material". The first base material 21 is configured by a transmissive and insulating plate. The wiring layer 20 is disposed between the first base material 21 and the plurality of pixel electrodes 28. Further, although not illustrated in FIG. 2, a light shielding portion 3 is disposed between the first base material 21 and the wiring layer 20. The plurality of pixel electrodes 28 are transmissive and are configured by a transparent electrode material, such as indium tin oxide (ITO) or indium zinc oxide (IZO), for example. In the element substrate 2, the first oriented film 29 is positioned closest to the liquid crystal layer 9, and orients liquid crystal molecules of the liquid crystal layer 9. Examples of a constituent material of the oriented film 29 include polyimide and silicon oxide, for example. Note that the element substrate 2 will be described later.

As illustrated in FIG. 2, the counter substrate 4 includes a second base material 41, an insulating film 42, a common electrode 45, and a second oriented film 46. The second base material 41, the insulating film 42, the common electrode 45, and the second oriented film 46 are arranged in this order. The second oriented film 46 is positioned closest to the liquid crystal layer 9. The second base material 41 is configured by a transmissive and insulating plate. The second base material 41 is configured by glass, quartz, or the like, for example. The insulating film is formed of a transmissive and insulating silicon-based inorganic material, such as silicon oxide, for example. The common electrode 45 is configured by a transparent electrode material, such as ITO or IZO, for example. The second oriented film 46 orients the liquid crystal molecules of the liquid crystal layer 9. Examples of a constituent material of the second oriented film 46 include polyimide and silicon oxide, for example.

The sealing member 8 is formed using an adhesive containing various types of curable resin, such as epoxy resin, for example. The sealing member 8 is affixed to each of the element substrate 2 and the counter substrate 4. An injection port 81 for injecting a liquid crystal material containing liquid crystal molecules into the sealing member 8 is formed in a portion, in the circumferential direction, of the sealing member 8. The injection port 81 is sealed by a sealing material 80 formed using various types of resin materials.

The liquid crystal layer 9 contains the liquid crystal molecules having positive or negative dielectric anisotropy. The liquid crystal layer 9 is interposed between the element substrate and the counter substrate 4 such that the liquid crystal molecules are in contact with both the first oriented film 29 and the second oriented film 46. The liquid crystal layer 9 is disposed between the plurality of pixel electrodes 28 and the common electrode 45, and optical characteristics thereof change due to an electric field. Specifically, the orientation of the liquid crystal molecules included in the liquid crystal layer 9 changes depending on a voltage applied to the liquid crystal layer 9.

As illustrated in FIG. 1, a plurality of scanning line drive circuits 11, a data line drive circuit 12, a plurality of external terminals 14, and a plurality of routing wiring lines 15 are arranged on a surface of the element substrate 2 on the counter substrate 4 side. The routing wiring lines 15 routed from each of the scanning line drive circuits 11 and the data line drive circuit are respectively connected to the plurality of external terminals 14.

Further, the electro-optical device 100 configured as described above includes a display region A10 that displays an image, and a peripheral region A20 surrounding the display region A10 in plan view. The display region A10 includes a plurality of pixels P arranged in a matrix pattern. The plurality of pixel electrodes 28 are disposed in a one-to-one manner in the plurality of pixels P. The scanning line drive circuits 11, the data line drive circuit 12, and the like are disposed in the peripheral region A20.

1A-2. Electrical Configuration

Figure 3:
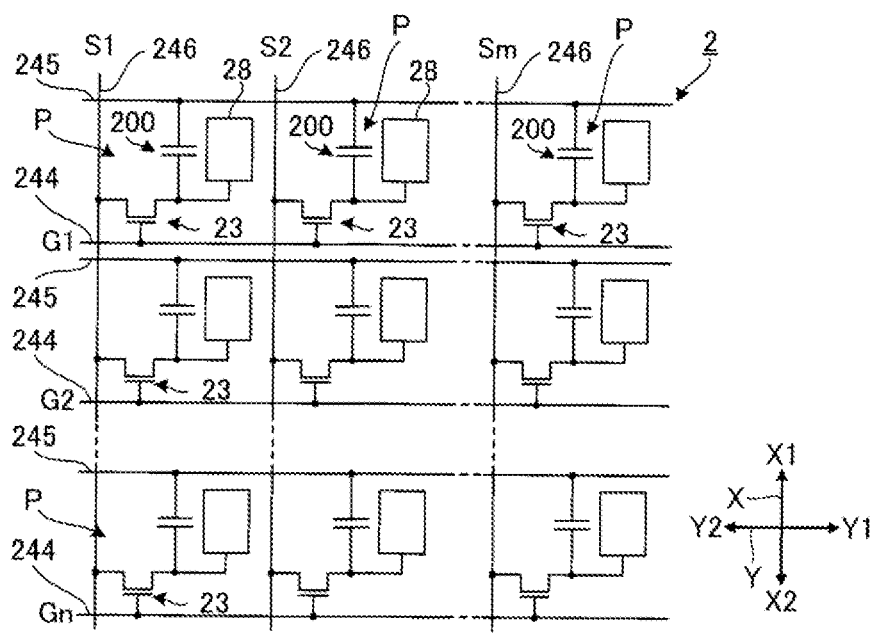
FIG. 3 is an equivalent circuit diagram illustrating an electrical configuration of an element substrate.

FIG. 3 is an equivalent circuit diagram illustrating an electrical configuration of the element substrate 2. As illustrated in FIG. 3, the element substrate 2 includes n scanning lines 244, m data lines 246, n first constant potential lines 245, a plurality of transistors 23, and a plurality of storage capacitors 200. Note that m and n are each an integer of 2 or more. Further, the first constant potential line 245 is a capacitance line. Each of the transistors 23 is a TFT that functions as a switching element, for example. Each of the transistors 23 includes a gate, a source, and a drain.

Each of the n scanning lines 244 extends along the Y-axis, and the n scanning lines 244 are arranged at equal intervals along the X-axis. Each of the n scanning lines 244 is electrically coupled to the respective gate of some of the transistors 23, among all the transistors 23. Further, the n scanning lines 244 are electrically coupled to the scanning line drive circuits 11 illustrated in FIG. 1. Scanning signals G1, G2, . . . , and Gn are line-sequentially supplied from the scanning line drive circuits 11 to the 1 to n scanning lines 244.

Each of the m data lines 246 illustrated in FIG. 3 extends along the X-axis, and the m data lines 246 are arranged at equal intervals along the Y-axis. Each of the m data lines 246 is electrically coupled to the respective source of some of the transistors 23, among all the transistors 23. The m data lines 246 are electrically coupled to the data line driving circuit 12 illustrated in FIG. 1. Image signals S1, S2, . . . , and Sm are line-sequentially supplied from the data line driving circuit 12 to the 1 to m data lines 246.

The n scanning lines 244 and the m data lines 246 illustrated in FIG. 3 are insulated from each other and are formed in a lattice pattern in plan view. A region surrounded by two of the adjacent scanning lines 244 and two of the adjacent data lines 246 corresponds to the pixel P. The plurality of pixel electrodes are disposed in a one-to-one manner with respect to the plurality of transistors 23. The drain of the corresponding transistor 23 is electrically coupled to each of the pixel electrodes 28.

Each of the n first constant potential lines 245 extends along the Y-axis, and the n first constant potential lines 245 are arranged at equal intervals along the X-axis. Further, the n first constant potential lines 245 are insulated from the plurality of data lines 246 and the plurality of scanning lines 244, and are formed so as to be separated from these lines. A fixed potential, such as a ground potential, is applied to each of the first constant potential lines 245. Further, the storage capacitor 200 is provided in parallel to a liquid crystal capacitor, between the first constant potential line 245 and the pixel electrode 28, to prevent leakage of a charge held in the liquid crystal capacitor. The storage capacitor 200 is a capacitive element for holding the potential of the pixel electrode 28 in accordance with the supplied image signal Sm.

When the scanning signals G1, G2, . . . , and Gn become sequentially active and the n scanning lines 244 are sequentially selected, the transistor 23 coupled to the selected scanning line 244 is turned to an on-state. Then, the image signals S1, S2, . . . , and Sm of a magnitude corresponding to the gray scale to be displayed are transmitted via the m data lines 246, to the pixel P corresponding to the selected scanning line 244, and then applied to the pixel electrode 28. In this way, the voltage corresponding to the gray scale to be displayed is applied to the liquid crystal capacitor formed between the pixel electrode 28 and the common electrode 45 of the counter substrate 4 illustrated in FIG. 2, and the orientation of the liquid crystal molecules changes in accordance with the applied voltage. Further, the applied voltage is held by the storage capacitor 200. Such changes in the orientation of the liquid crystal molecules cause the light to be modulated, and gray scale display becomes possible.

1A-3. Configuration of Element Substrate 2

Figure 4:
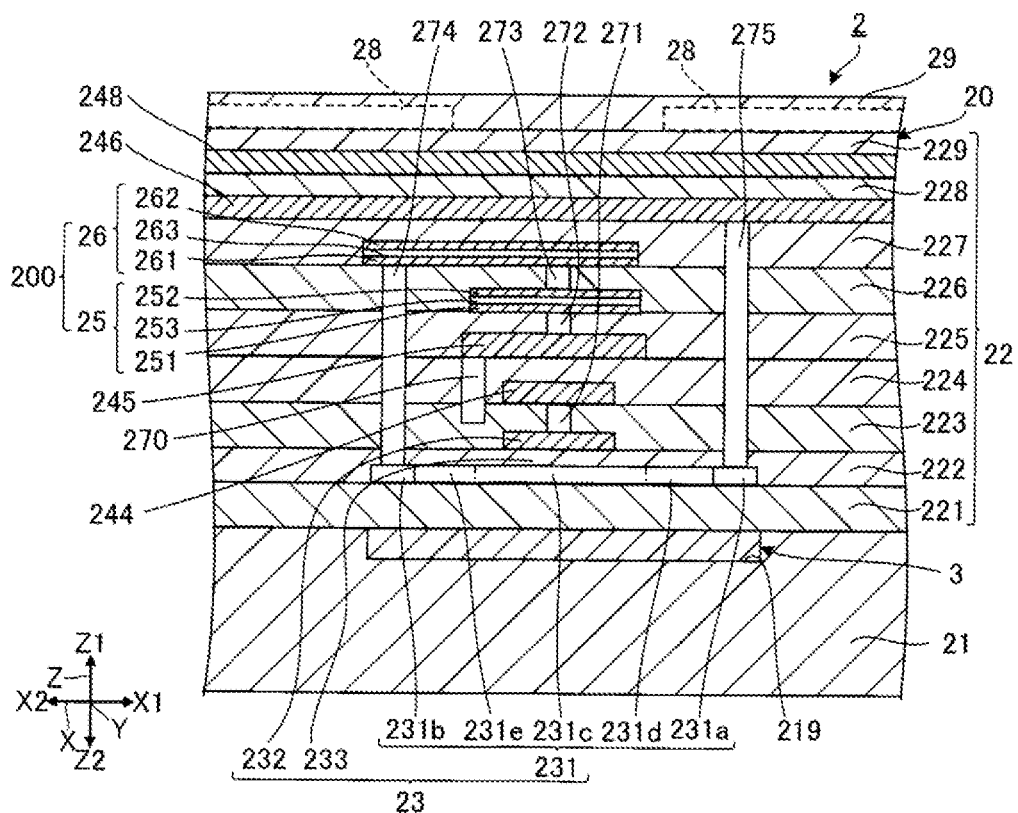
FIG. 4 is a cross-sectional view illustrating a part of the element substrate.

FIG. 4 is a cross-sectional view illustrating a part of the element substrate 2. In the following description, the direction Z1 is described as being upward and the direction as Z2 as downward. As illustrated in FIG. 4, the element substrate 2 includes the first base material 21, the light shielding portion 3, the wiring layer 20, the plurality of pixel electrodes 28, and the oriented film 29. The first base material 21 is configured by an inorganic material and having insulating and transmission properties. The first base material 21 is configured by glass or quartz, for example. In particular, the first base material 21 is preferably configured by silicate glass such as quartz glass, or the like. As a result of the first base material 21 being configured by quartz glass, the adhesion between the light shielding portion 3 and the first base material 21, to be described later, can be particularly improved, compared to a case in which the first base material 21 is configured by another material.

The first base material 21 has a plurality of recessed portions 219. Note that in FIG. 4, of the plurality of recessed portions 219, one of the recessed portions 219 is illustrated. Further, although not illustrated, the plurality of recessed portions 219 are arranged in a matrix shape. The recessed portion 219 is a recess formed in the first base material 21. The surfaces of the recessed portion 219 include a bottom surface and side surfaces. The bottom surface is a surface along the X-Y plane. The side surfaces are surfaces that connect the bottom surface and an upper surface 211 of the first base material 21. Additionally, the plurality of recessed portions 219 are disposed in a one-to-one manner with respect to the plurality of transistors 23. Although not illustrated, each of the recessed portions 219 overlaps with the corresponding transistor 23 in plan view.

The light shielding portion 3 is disposed on the first base material 21. The light shielding portion 3 has light shielding properties. The "light shielding properties" refer to light shielding properties with respect to visible light, specifically referring to the light shielding properties with respect to visible light, and preferably referring to a transmittance of visible light of less than 50%, and more preferably to a transmittance of visible light of less than 10%. Further, the light shielding portion 3 is electrically conductive. However, the light shielding portion 3 is insulated from the various wiring lines and the transistors 23. The light shielding portion 3 will be described in more detail below.

The wiring layer 20 is disposed on the light shielding portion 3. The wiring layer 20 includes the plurality of transistors 23, the plurality of scanning lines 244, the plurality of first constant potential lines 245, the plurality of storage capacitors 200, the plurality of data lines 246, and a plurality of second constant potential lines 248. Note that in FIG. 4, one of the scanning lines 244, one of the first constant potential lines 245, one of the storage capacitors 200, one of the data lines 246, and one of the second constant potential lines 248 corresponding to one of the transistors 23 are illustrated. Further, the wiring layer 20 includes an insulating and transmissive insulator 22. The insulator 22 includes insulating films 221, 222, 223, 224, 225, 226, 227, 228, and 229. The insulating films 221, 222, 223, 224, 225, 226, 227, 228, and 229 are arranged in this order from the first base material 21 toward the plurality of pixel electrodes 28. The insulating films 221 to 229 are configured by a silicon oxide film formed by, for example, thermal oxidation, chemical vapor deposition (CVD), or the like. The wiring lines and electrodes included in the wiring layer 20 are disposed between the films configuring the insulating layer 22, so as to be in contact with the films.

The insulating film 221 is disposed on the first base material 21, covering the light shielding portion 3. The transistors 23 are disposed on the insulating film 221. Each of the transistors 23 includes a semiconductor layer 231, a gate electrode 232, and a gate insulating film 233. The semiconductor layer 231 is disposed between the insulating film 222 and the insulating film 223. The semiconductor layer 231 includes a source region 231a, a drain region 231b, a channel region 231c, a first lightly doped drain (LDD) region 231d, and a second LDD region 231e. The semiconductor layer 231 is formed, for example, by film formation of polysilicon, and the regions excluding the channel region 231c are doped with impurities that enhance conductivity. An impurity concentration in the first LDD region 231d and the second LDD region 231e is lower than an impurity concentration in the source region 231a and the drain region 231b. Note that at least one of the first LDD region 231d and the second LDD region 231e may be omitted.

The gate electrode 232 is disposed between the insulating film 222 and the insulating film 223. The gate electrode 232 overlaps with the channel region 231c of the semiconductor layer 231 when viewed from the direction Z1. The gate electrode 232 is formed, for example, by being doped with impurities that enhance the conductivity of the polysilicon. Note that the gate electrode 232 may be formed using a conductive material such as a metal, a metal silicide, and a metal compound. Further, the gate insulating film 233 is interposed between the gate electrode 232 and the channel region 231c. The gate insulating film 233 is formed of silicon oxide formed by thermal oxidation or CVD, for example.

The scanning line 244 is disposed between the insulating film 223 and the insulating film 224. The scanning line 244 is coupled to the gate electrode 232 via a contact portion 271 that penetrates the insulating film 223. Note that in the present embodiment, the gate electrode 232 and the light shielding portion 3 are insulated from each other, but these may be electrically coupled. In this case, the light shielding portion 3 can be used as a back gate.

The first constant potential line 245 is disposed between the insulating film 224 and the insulating film 225. A shielding portion 270 is coupled to the first constant potential line 245. The shielding portion 270 is disposed so as to penetrate the insulating film 224 and reach an intermediate position in the thickness direction of the insulating film 223. Further, the shielding portion 270 overlaps with the second LDD region 231e when viewed from the direction Z1. The shielding portion 270 functions as a shield that suppresses an effect, on the transistor 23, of a leakage electric field from the scanning line 244. Further, the shielding portion 270 functions as a light shielding portion of the semiconductor layer 231. A fixed potential is supplied to the shielding portion 270 from the first constant potential line 245.

The storage capacitor 200 is disposed on the insulating film 225. The storage capacitor 200 includes a first capacitor 25 and a second capacitor 26. The first capacitor 25 is disposed between the insulating film 225 and the insulating film 226. The first capacitor 25 includes a lower capacitor electrode 251, an upper capacitor electrode 252, and a dielectric layer 253 disposed therebetween. The lower capacitor electrode 251 is coupled to the first constant potential line 245 via a contact portion 272 that penetrates the insulating film 225. Further, the second capacitor 26 is disposed between the insulating film 226 and the insulating film 227. The second capacitor 26 includes a lower capacitor electrode 261, an upper capacitor electrode 262, and a dielectric layer 263 disposed therebetween. The lower capacitor electrode 261 is coupled to the upper capacitor electrode 252 of the first capacitor 25 via a contact portion 273 that penetrates the insulating film 226. Further, the lower capacitor electrode 261 is electrically coupled to the drain region 231b of the transistor 23 via a contact portion 274 that penetrates the insulating films 222 to 226. The upper capacitor electrode 252 of the first capacitor 25 is electrically coupled to the pixel electrode 28 disposed on the wiring layer 20, via a contact portion (not illustrated) or the like.

The data line 246 is disposed between the insulating film 227 and the insulating film 228. The data line 246 is in contact with the insulating film 227 and the insulating film 228. The data line 246 is electrically coupled to the source region 231a of the transistor 23 via a contact portion 275 that penetrates the insulating films 222 to 227. Further, the second constant potential line 248 is disposed between the insulating film 228 and the insulating film 229. The second constant potential line 248 is electrically coupled to the upper capacitor electrode 262 of the second capacitor 26 via a contact portion (not illustrated) or the like. In a similar manner to the first constant potential line 245, a fixed potential, such as a ground potential, for example, is applied to the second constant potential line 248. The fixed potential supplied to the first constant potential line 245 and the fixed potential supplied to the second constant potential line 248 are the same potential.

The lower capacitor electrode 251, the upper capacitor electrode 252, the lower capacitor electrode 261, and the upper capacitor electrode 262 are configured by a titanium nitride film, for example. The wiring lines of the scanning line 244, the first constant potential line 245, the data line 246, the second constant potential line 248, and the like are configured by a layered body of an aluminum film and a titanium nitride film, for example. By including the aluminum film, resistance can be reduced compared to a case in which the wiring lines are configured by the titanium nitride film only. Note that each of these electrodes or wiring lines may be configured by materials other than the aforementioned materials. For example, each of these electrodes or wiring lines may be configured by a metal, such as tungsten (W), titanium (Ti), chromium (Cr), iron, and aluminum (Al), and the like, by a metal nitride, metal silicide, or the like.

Note that the configuration and arrangement of the wiring lines and the like included in the wiring layer 20 is not limited to the example illustrated in FIG. 4. For example, the various wiring lines may be disposed below the layer in which the transistors 23 are disposed. Further, either one of the first capacitor 25 and the second capacitor 26 may be omitted.

Figure 5:
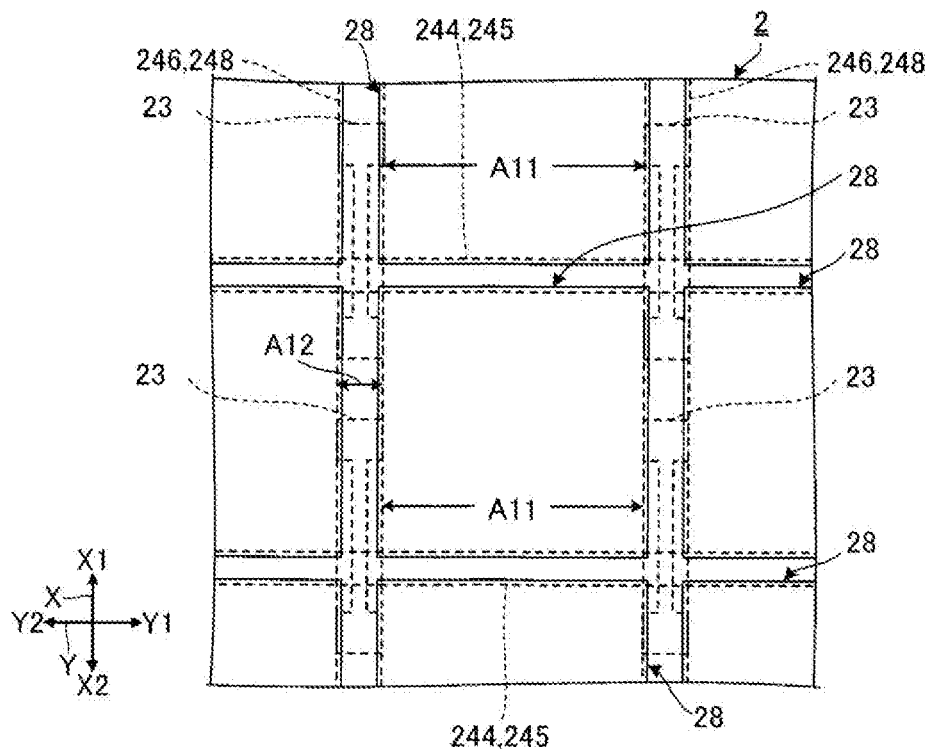
FIG. 5 is a plan view illustrating a part of an element substrate 2.

FIG. 5 is a plan view illustrating a part of the element substrate 2. As illustrated in FIG. 5, the element substrate 2 includes a plurality of light-transmitting regions A11 through which light is transmitted and a wiring region A12 that blocks light. The shape of each of the plurality of light-transmitting regions A11 in plan view is substantially quadrangular, and the plurality of light-transmitting regions A11 are disposed in a matrix shape in plan view. The plurality of pixel electrodes 28 are disposed in a one-to-one manner in the plurality of light-transmitting regions A11. The wiring region A12 has a lattice shape as seen in plan view, and surrounds each of the light-transmitting regions A11. The plurality of transistors 23, the plurality of storage capacitors 200, the plurality of scanning lines 244, the plurality of data lines 246, the plurality of first constant potential lines 245, and the plurality of second constant potential lines 248 are disposed in the wiring region A12. The plurality of scanning lines 244 and the plurality of data lines 246 are formed in a lattice shape when viewed in the direction Z1. The plurality of first constant potential lines 245 and the plurality of second constant potential lines 248 are formed in a lattice shape when viewed in the direction Z1. The transistor 23 is disposed at an intersection position at which the scanning line 244 and the data line 246 intersect in plan view. Although not illustrated, the storage capacitor 200 is disposed at the intersecting position in plan view.

1A-4. Light Shielding Portion 3

Figure 6:
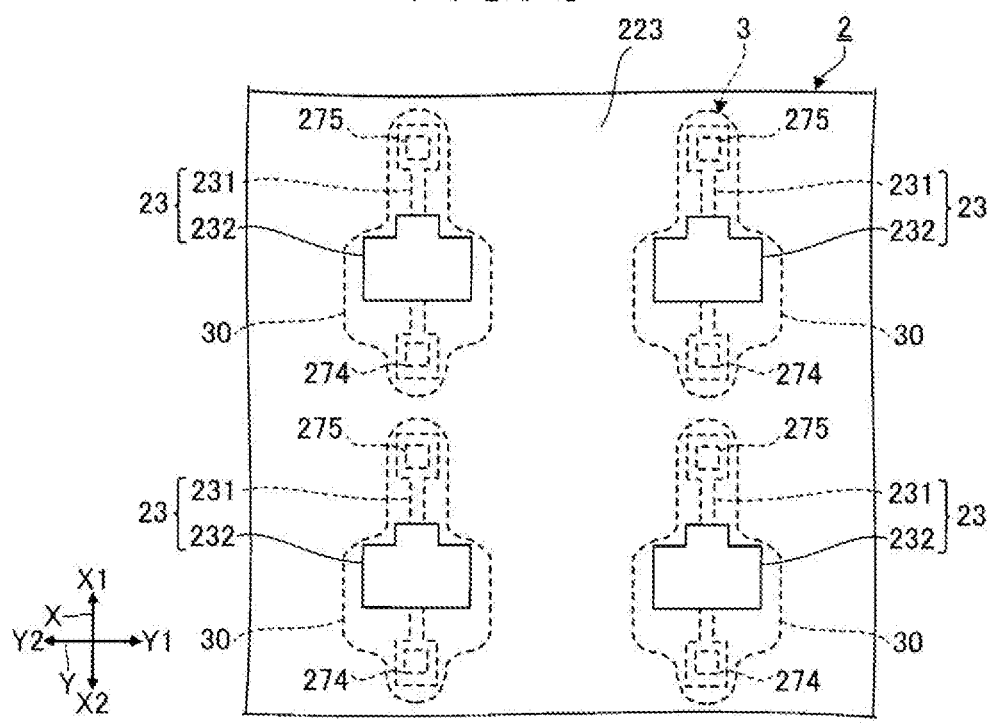
FIG. 6 is a plan view illustrating a part of a light shielding portion and some of a plurality of transistors.

FIG. 6 is a plan view illustrating a part of the light shielding portion 3 and some of the plurality of transistors 23. As illustrated in FIG. 6, the light shielding portion 3 includes a plurality of light shielding sections 30. The plurality of light shielding sections 30 are arranged in a matrix pattern in plan view. The plurality of light shielding sections 30 are disposed in a one-to-one manner with respect to the plurality of transistors 23. The shape of each of the light shielding sections 30 in plan view is a rectangular shape whose lengthwise direction is a direction along the X-axis, but the shape is not limited thereto. Each of the light shielding sections 30 overlaps with the corresponding transistor 23 in plan view. Specifically, the light shielding section 30 overlaps with the semiconductor layer 231 and the gate electrode 232 in plan view. Each of the light shielding sections 30 blocks light from being incident on the corresponding transistor 23.

The area, in plan view, of the light shielding section illustrated in FIG. 6 is larger than the area of the semiconductor layer 231 of the transistor 23 in plan view, but may be smaller. The light shielding section 30 preferably overlaps with at least the channel region 231c of the semiconductor layer 231 to reduce erroneous operation of the transistor 23 due to the incidence of light.

Figure 7:
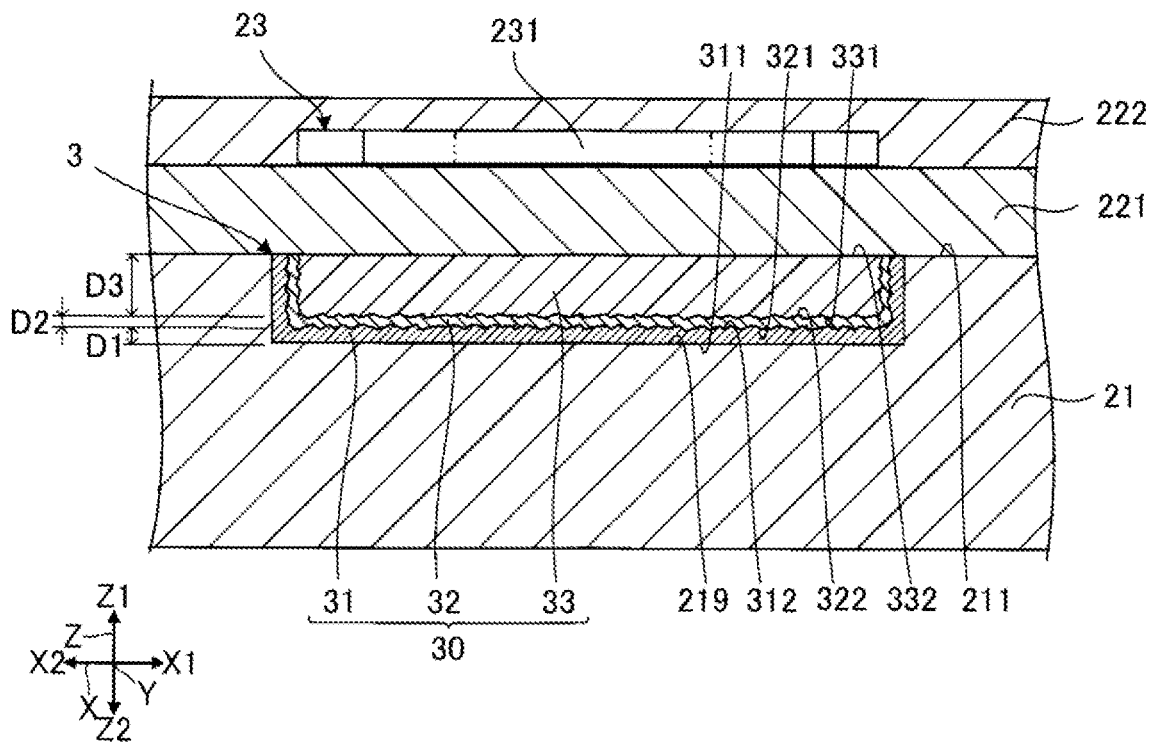
FIG. 7 is a cross-sectional view illustrating a part of the light shielding portion.

FIG. 7 is a cross-sectional view illustrating a part of the light shielding portion 3. One of the light shielding sections 30, of the plurality of light shielding sections 30, is illustrated in FIG. 7. The light shielding section 30 is disposed within the recessed portion 219 of the first base material 21. By disposing the light shielding section 30 inside the recessed portion 219, the thickness of the light shielding section 30 is more easily made thicker and the adhesion between the light shielding section 30 and the first base material 21 can be further improved compared to a case in which the light shielding section 30 is disposed on the upper surface 211 of the first base material 21.

As illustrated in FIG. 7, the light shielding section 30 includes a first film 31, a second film 32, and a third film 33. The first film 31, the second film 32, and the third film 33 are arranged in this order from the first base material 21. In other words, the light shielding section 30 has a layered structure of the first film 31, the second film 32, and the third film 33. The first film 31 includes tungsten silicide. The second film 32 includes titanium nitride or tungsten nitride. The third film 33 includes tungsten.

By providing the first film 31, the adhesion between the second film 32 and the first base material 21 can be improved compared to a case in which the first film 31 is not provided. Further, by providing the second film 32, the adhesion between the first film 31 and the third film 33 can be improved. Additionally, by providing the third film 33, the light shielding properties of the light shielding portion 3 can be sufficiently secured. Therefore, by providing the first film 31, the second film 32, and the third film 33, the risk of the light shielding portion 3 from peeling off from the first base material 21 can be suppressed, compared to the related art. In other words, the adhesion of the light shielding portion 3 to the first base material 21 can be increased, and as a result, a deterioration in a light shielding performance by the light shielding portion 3 can be suppressed. Further, since the peeling off of the light shielding portion 3 at the time of manufacturing can be suppressed, a degree of freedom relating to the shape and thickness of the light shielding portion 3 can be increased, for example.

The second film 32 preferably includes tungsten nitride, rather than titanium nitride. When the second film 32 includes titanium nitride, the titanium contained in the titanium nitride may diffuse into the insulator 22 and affect the transistor 23. Therefore, the second film 32 of the light shielding section 30 located below the transistor 23 particularly preferably includes tungsten nitride, and particularly preferably does not include titanium nitride. Further, the second film 32 functions as a barrier layer that suppresses diffusion of components of the first film 31 into the third film 33. Therefore, by disposing the second film 32 between the first film 31 and the third film 33, a deterioration in an optical density (OD) value of the third film 33 can be suppressed.

By configuring the third film 33 by tungsten, the entire thickness of the light shielding section 30 is easily formed to be thick, and the light shielding properties of the light shielding section 30 can be increased. Further, because the main component of the light shielding section 30 is tungsten, compared to a case in which the main component is another metal, it is particularly easy to form the entire thickness of the light shielding section 30 to be thick, and the light shielding properties of the light shielding section 30 can be particularly increased.

The third film 33 is a dense film in which no pin holes are present. As a result, a deterioration in the light shielding properties of the light shielding section 30 due to the presence of the pin holes is prevented.

Note that each of the first film 31, the second film 32, and the third film 33 may include, for example, approximately 5% of other metals, for example, other than the metals described above. Further, the second film 32 may include both titanium nitride and tungsten nitride. Further, the second film 32 may have a layered structure of a layer containing titanium nitride and a layer containing tungsten nitride, for example.

As illustrated in FIG. 7, a thickness D1 of the first film 31 is thinner than a thickness D3 of the third film 33 and is thicker than a thickness D2 of the second film 32. In other words, the thicknesses D1, D2, and D3 satisfy D2<D1<D3. When the thickness D1 is thicker than the thickness D2, the adhesion between the first base material 21 and the first film 31 and the adhesion between the first film 31 and the second film 32 can be further improved, compared to a case in which the thickness D1 is thinner than the thickness D2. Further, when the thickness D1 is thinner than the thickness D3, compared to a case in which the thickness D1 is thicker than the thickness D3, the overall thickness of the light shielding portion 3 is prevented from becoming excessively thick, while sufficiently securing the light shielding properties of the light shielding portion 3. Note that each of the thicknesses D1, D2, and D3 is an average thickness.

The thickness D1 is not particularly limited, but is preferably from 1 nm to 200 nm, for example. The thickness D2 is not particularly limited, but is preferably from 1 nm to 100 nm, for example. The thickness D3 is not particularly limited, but is preferably from 10 nm to 500 nm, for examples. By satisfying the aforementioned ranges for each of the thicknesses D1, D2, and D3, while suppressing the overall thickness of the light shielding portions 3, the effects of increasing the adhesion of the light shielding portion 3 and also increasing the light shielding properties of the light shielding portion 3 can be particularly noticeably exhibited. Note that the thicknesses D1, D2, and D3 need not necessarily satisfy the relationship D2<D1<D3. For example, the thickness D2 may be thicker than, or may be the same as the thickness D1. Moreover, a specific value of each of the thicknesses D1, D2, and D3 is not limited to a value within the range described above, and may be a value outside of the range described above.

As illustrated in FIG. 7, the first film 31 includes a first surface 311 in contact with the first base material 21 and a second surface 312 in contact with the second film 32. The first surface 311 is in contact with the bottom surface and the side surfaces of the recessed portion 219. In the present embodiment, the first surface 311 is a smooth surface. On the other hand, the second surface 312 has surface unevenness. The roughness of the second surface 312 is greater than the roughness of the first surface 311. Specifically, the arithmetic mean roughness of the second surface 312 is greater than the arithmetic mean roughness of the first surface 311. Because the second surface 312 has the surface unevenness, the adhesion between the first film 31 and the second film 32 can be improved due to an anchoring effect. As a result, peeling between the first film 31 and the second film 32 can be particularly effectively suppressed. Thus, the peeling off of the light shielding port 3 from the first base material 21 can be particularly effectively suppressed. Further, by providing the second surface 312 having the surface unevenness for all of the light shielding sections 30, an improvement in yield can be particularly effectively achieved.

The second surface 312 has a bottom surface and side surfaces, similar to the shape of the recessed portion 219. In the present embodiment, the bottom surface and the side surfaces have surface unevenness. That is, the surface unevenness is present over the entire second surface 312. Due to the presence of the surface unevenness on the side surfaces of the second surface 312 and not only on the bottom surface of the second surface 312, the adhesion between the first film 31 and the second film 32 can be improved, compared to a case in which the surface unevenness is not present on the side surfaces of the second surface 312.

An arithmetic mean roughness Ra of the second surface 312 is not particularly limited, but is preferably from 1 nm to 10 nm, and more preferably from 2 nm to 5 nm, for example. Further, Ra/D1, which is the ratio of the arithmetic mean roughness Ra of the second surface 312 to the thickness D1 of the first film 31 is not particularly limited, but is preferably from 0.005 to 0.5, and more preferably from 0.02 to 0.25, for example.

As a result of the arithmetic mean roughness Ra being within the range described above, the adhesion between the first film 31 and the second film 32 can be particularly increased. Thus, the risk of the peeling off of the light shielding portion 3 from the first base material 21 can be particularly effectively suppressed. Further, since the arithmetic mean roughness Ra is within the range described above, it is possible to suppress a risk of defects, such as cracks or the like, from occurring in the light shielding portion 3 due to the arithmetic mean roughness Ra being excessively large.

Note that the specific value of the arithmetic mean roughness Ra of the second surface 312 is not limited to a value within the range described above, and may be a value outside of the range described above.

As illustrated in FIG. 7, the second film 32 includes a third surface 321 that is in contact with the first film 31, and a fourth surface 322 that is in contact with the third film 33. Due to the effect of the surface unevenness of the second surface 312 of the first film 31, each of the third surface 321 and the fourth surface 322 has surface unevenness. Thus, the roughness of the third surface 321 and the roughness of the fourth surface 322 are respectively greater than the roughness of the first surface 311. Specifically, the arithmetic mean roughness of each of the third surface 321 and the fourth surface 322 is greater than the arithmetic mean roughness of the first surface 311.

Since the fourth surface 322 has the surface unevenness, the adhesion between the second film 32 and the third film 33 can be improved due to the anchoring effect. In particular, by causing the second surface 312 of the first film 31 to have the surface unevenness and the fourth surface 322 of the second film 32 to have the surface unevenness, the peeling off of the light shielding portion 3 from the first base material 21 can be most effectively suppressed.

As illustrated in FIG. 7, the third film 33 includes a fifth surface 331 that is in contact with the second film 32, and a sixth surface 332 that is in contact with the insulating film 221. The sixth surface 332 and the upper surface 211 of the first base material 21 configure a continuous flat surface without any level differences. The fifth surface 331 is in contact with the fourth surface 322, and thus has surface unevenness. On the other hand, the sixth surface 332 is a smooth surface. Thus, the roughness of the sixth surface 332 is less than the roughness of the fifth surface 331. Specifically, the arithmetic mean roughness of the sixth surface 332 is less than the arithmetic mean roughness of the fifth surface 331. Since the sixth surface 332 is the smooth surface, the risk is suppressed of the transistor 23 being adversely impacted due to the unevenness of the sixth surface 332.

Further, since the flat surface is configured by the sixth surface 332 and the upper surface 211 of the first base material 21, there are no level differences between the sixth surface 332 and the upper surface 211 of the first base material 21. Therefore, there is no diffused reflection of light from the level difference, and the risk of light being incident on the transistor 23 can thus be more effectively suppressed. Note that a level difference may be present between the sixth surface 332 and the upper surface 211 of the first base material 21.

Here, any one of the plurality of pixel electrodes 28 is a "first pixel electrode", and another of the pixel electrodes 28 is a "second pixel electrode". Further, one of the transistors 23 electrically coupled to the "first pixel electrode" is referred to as a "first transistor", and one of the transistors 23 electrically coupled to the "second pixel electrode" is referred to as a "second transistor". Further, the light shielding section 30 disposed between the "first pixel electrode" and the "first transistor" is referred to as a "first light shielding section", and the light shielding section 30 disposed between the "second pixel electrode" and the "second transistor" is referred to as a "second light shielding section". In this case, each of the "first light shielding section" and the "second light shielding section" includes the first film 31, the second film 32, and the third film. In other words, each of the plurality of light shielding sections 30 includes the first film 31, the second film 32, and the third film, and is disposed between the first base material 21 and the transistor 23. Thus, in plan view, the light incident on each of the transistors 23 can be blocked by the light shielding portion 3. As a result, the risk of erroneous operation caused by leakage current can be suppressed.

Further, the corresponding light shielding sections 30 are respectively disposed for each of all of the transistors 23. Thus, the reliability of the electro-optical device 100 can be increased compared to a case in which the transistor 23 for which the light shielding section 30 is not disposed in a corresponding manner is present. Note that the transistor 23 for which the light shielding section 30 is not disposed in the corresponding manner may be present.

Further, the plurality of light shielding sections 30 are not coupled to each other. Therefore, stress acting on the element substrate 2 can be reduced compared to a case in which the plurality of light shielding sections 30 are coupled to each other. Thus, warping of the element substrate 2 can be suppressed.

1A-5. Manufacturing Method of Electro-Optical Device 100

Figure 8:
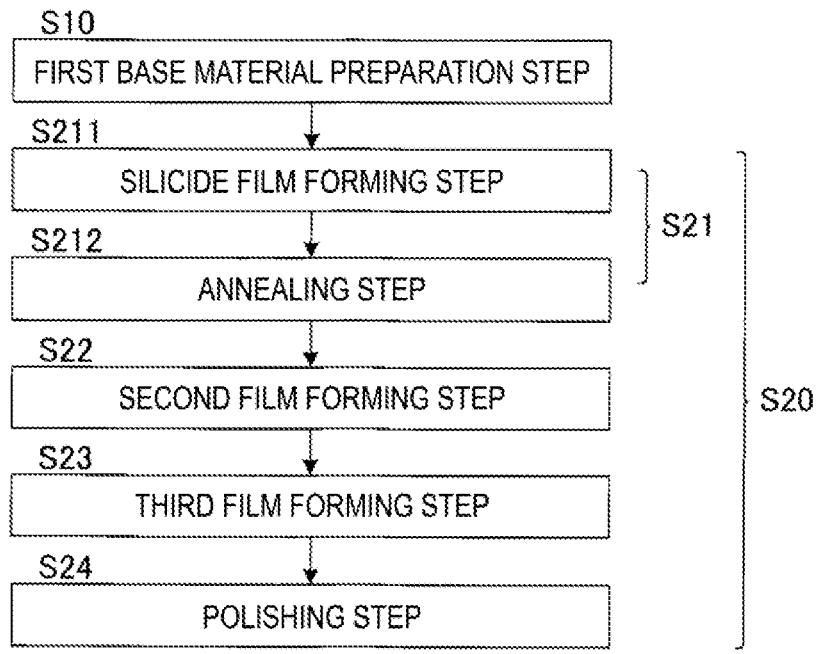
FIG. 8 is a diagram illustrating a flow of a manufacturing method of the electro-optical device according to the first embodiment.

FIG. 8 is a diagram illustrating a flow of a manufacturing method of the electro-optical device 100 according to the first embodiment. In FIG. 8, in the manufacturing steps of the electro-optical device 100, steps for manufacturing the light shielding portion 3 are illustrated as representative of the manufacturing method. Note that the structure of the electro-optical device 100 other than the light shielding portion 3 is manufactured using a known method, for example.

As illustrated in FIG. 8, the method for manufacturing the electro-optical device 100 includes a first base material preparation step S10 and a light shielding portion forming step S20. The light shielding portion forming step S20 includes a first film forming step S21, a second film forming step S22, a third film forming step S23, and a polishing step S24. The first film forming step S21 includes a silicide film forming step S211 and an annealing step S212. Each of the steps will be described in order below.

Figure 9:
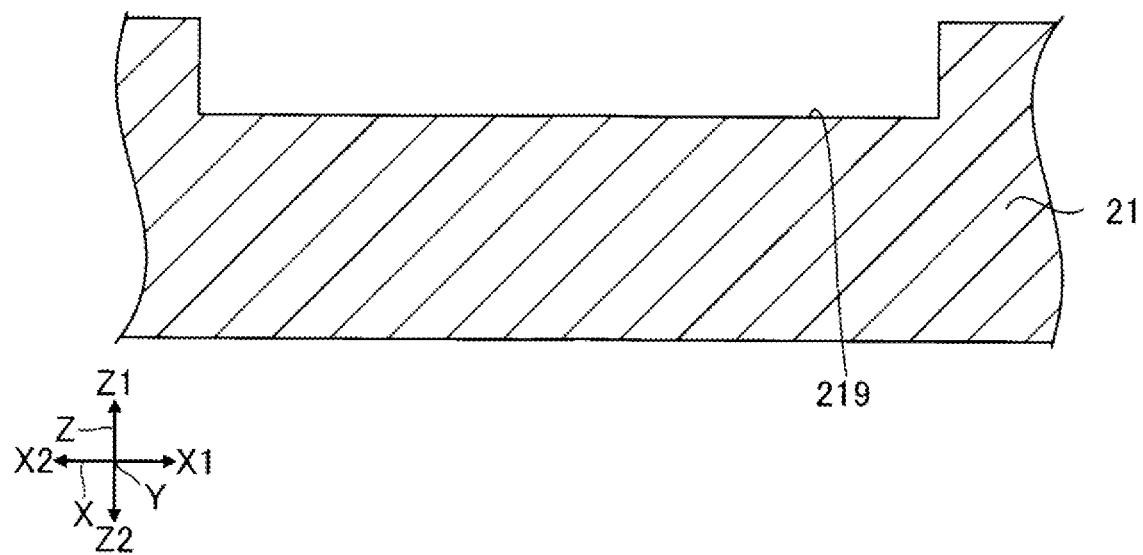
FIG. 9 is a cross-sectional view of a first base material in a first base material preparation step.

FIG. 9 is a cross-sectional view of the first base material 21 in the first base material preparation step S10. In the first base material preparation step S10, the first base material 21 including the recessed portion 219 is prepared, as illustrated in FIG. 9. For example, although not illustrated, a flat plate configured by quartz glass or the like is etched using a mask having a shape corresponding to the recessed portion 219. In this way, the base material 21 including the recessed portion 219 is formed.

Figure 10:
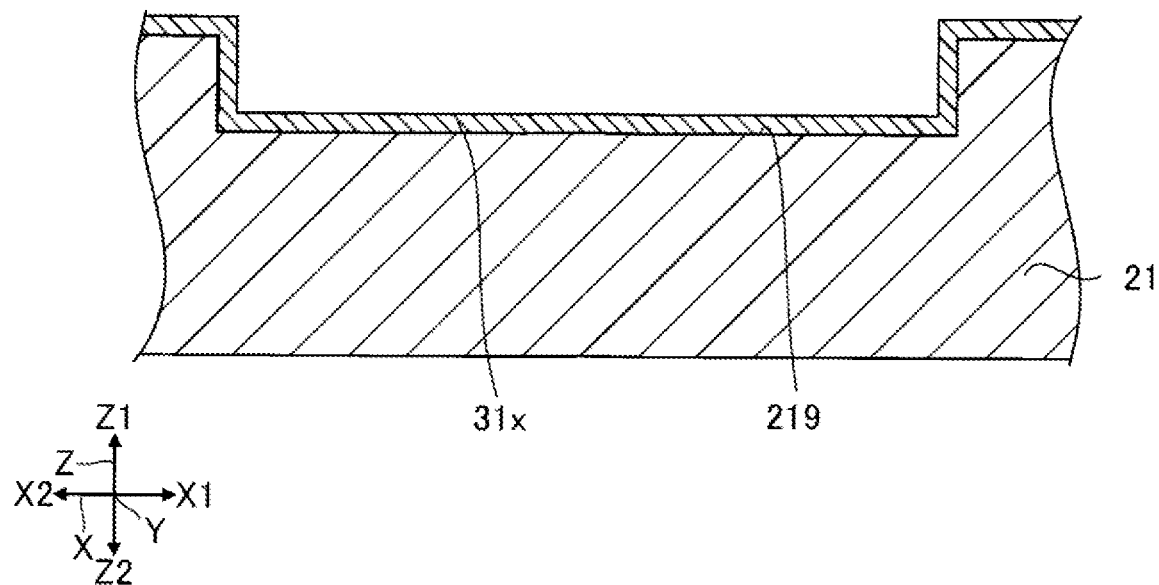
FIG. 10 is a cross-sectional view of the first substrate and a silicide film in a silicide film forming step.

FIG. 10 is a cross-sectional view of the first base material 21 and a silicide film 31x in the silicide film forming step S211. In the silicide film forming step S211, the silicide film 31x is formed on the first base material 21, as illustrated in FIG. 10. The silicide film 31x includes tungsten silicide. For example, a material including tungsten silicide is deposited in the recessed portion 219 by a vapor deposition method such as a sputtering method or CVD, thereby forming the silicide film 31x inside the recessed portion 219. The silicide film 31x becomes a first film 31a after passing through the following step. The thickness of the silicide film 31x is not particularly limited, but is from 1 nm to 200 nm, for example.

Figure 11:
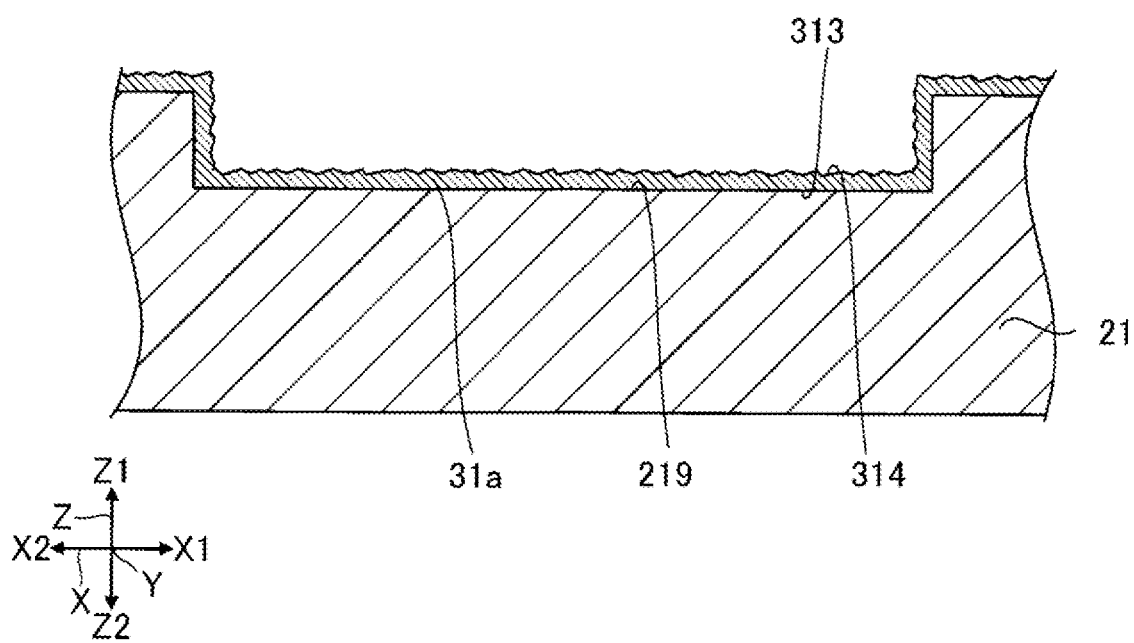
FIG. 11 is a cross-sectional view of the first substrate and a first film in an annealing step.

FIG. 11 is a cross-sectional view of the first base material 21 and the first film 31a in the annealing step S212. In the annealing step S212, the first film 31a is formed on the first base material 21 by annealing the silicide film 31x, as illustrated in FIG. 11. The first film 31a is a film prior to polishing of the first film 31 that is obtained by the polishing step S24. The first film 31a has a lower surface 313 and an upper surface 314 opposite to the lower surface 313. The lower surface 313 is in contact with the first base material 21.

The tungsten silicide is crystallized by annealing the silicide film 31x. By crystallizing the tungsten silicide, the roughness of the upper surface 314 of the first film 31a increases. In other words, the roughness of the upper surface 314 is greater than the roughness of the lower surface 313, since the state of the upper surface 314 changes from a smooth state to a state in which unevenness is present. As described above, the silicide film 31x is formed in the silicide film forming step S211, and the first film 31a having the unevenness on the upper surface 314 can be easily formed by annealing the silicide film 31x in the annealing step S212.

Nitrogen ($N_2$) or oxygen ($O_2$) is used as the gas for annealing. By using nitrogen or oxygen, the state of the upper surface 314 can be easily and reliably changed from the smooth state to the state in which the unevenness is present. In particular, by using nitrogen, the upper surface 314 having a target roughness can be particularly easily formed. Note that, when oxygen is used, there is a risk that an oxide film may be formed on the first film 31a. When the oxide film is formed on the first film 31a, there is a risk that the unevenness of the upper surface 314 may be flattened by the oxide film. Therefore, when oxygen is used, it is preferable to perform a process in which the oxide film is removed after the annealing is performed.

The temperature in the annealing is preferably from 600° C. to 1500° C., for example, and more preferably from 800° C. to 1000° C. When the temperature is within the range described above, stress on the light shielding portion can be particularly effectively alleviated, and at the same time, the upper surface 314 having the target roughness can be formed quickly and reliably.

In the annealing step S212, the roughness of the upper surface 314 of the first film 31 can be changed by changing an annealing temperature, or the gas, for example. Thus, for example, the annealing temperature or the gas is set in accordance with the target roughness of the top surface 314. Note that the roughness of the upper surface 314 is the same as the roughness of the first surface 311 of the first film 31 described above.

Figure 12:
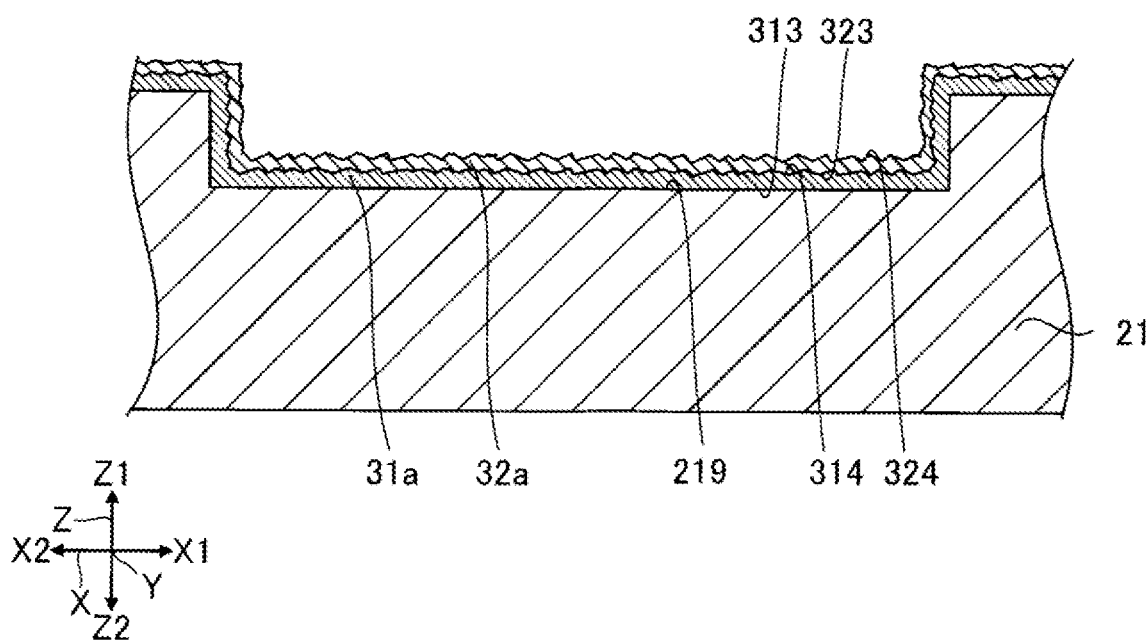
FIG. 12 is a cross-sectional view of the first substrate, the first film, and a second film in a second film forming step.

FIG. 12 is a cross-sectional view of the first base material 21, the first film 31a, and a second film 32a in the second film forming step S22. In the second film forming step S22, the second film 32a is formed on the first film 31a, as illustrated in FIG. 12. The second film 32a includes titanium nitride or tungsten nitride. For example, a material including titanium nitride or tungsten silicide is deposited on the first film 31a by a vapor deposition method such as a sputtering method, CVD, or the like. In this way, the second film 32a is formed on the first film 31a. The second film 32a is a film prior to polishing of the second film 32 obtained by the polishing step S24. The second film 32a has a lower surface 323 and an upper surface 324 opposite to the lower surface 323. The lower surface 323 is in contact with the first film 31a. Note that the thickness and roughness of the second film 32a are the same as the thickness and roughness of the second film 32 described above.

Figure 13:
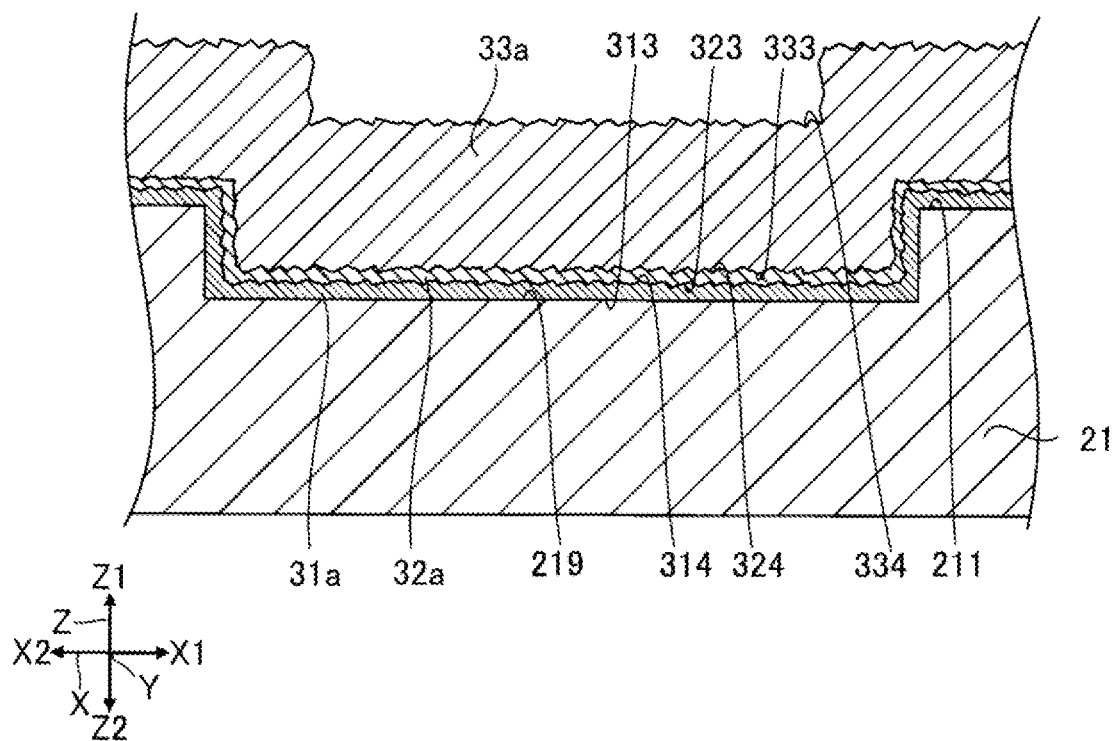
FIG. 13 is a cross-sectional view of the first substrate, the first film, the second film, and a third film in a third film forming step.

FIG. 13 is a cross-sectional view of the first base material 21, the first film 31a, the second film 32a, and a third film 33a in the third film forming step S23. In the third film forming step S23, the third film 33a is formed on the second film 32a, as illustrated in FIG. 13. The third film 33a includes tungsten. For example, a material containing tungsten is deposited on the second film 32a by a vapor deposition method, such as a sputtering method, CVD, or the like. In this way, the third film 33a is formed on the second film 32a. The third film 33a is a film prior to polishing of the third film 33 obtained by the polishing step S24. The third film 33a has a lower surface 333 and an upper surface 334 opposite to the lower surface 333. The lower surface 333 is in contact with the second film 32a. Note that the thickness and roughness of the third film 33a are the same as the thickness and roughness of the third film 33 described above.

In the second film forming step S22, the first film 31a and the second film 32a are not annealed. Further, in the third film forming step S23, the first film 31a, the second film 32a, and the third film 33a are not annealed. Here, if annealing is performed in the third film forming step S23, the third film 33a peels off as a result of the crystallization of the first film 31, pinholes are generated in the third film 33a, and the like. Therefore, the annealing is not performed in the second film forming step S22 or the third film forming step S23, and the formation of pin holes in the third film 33a can thus be suppressed. Therefore, a deterioration in the light shielding properties of the light shielding section 30 due to the presence of the pin holes in the third film 33a is prevented.

Figure 14:
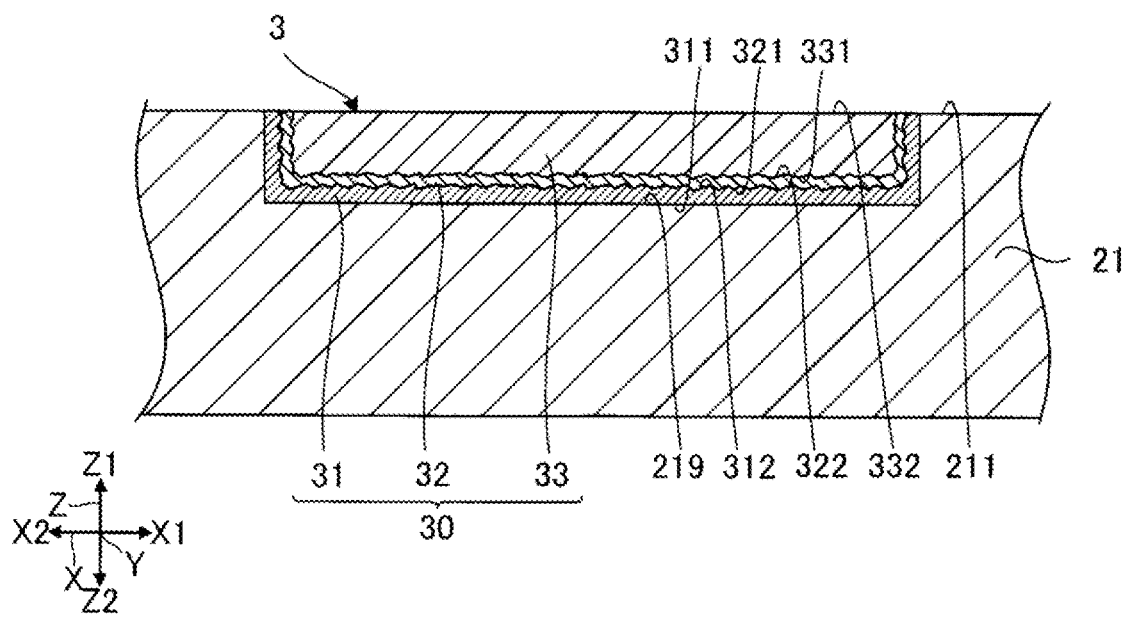
FIG. 14 is a cross-sectional view of the first substrate and the light shielding portion in a polishing step.

FIG. 14 is a cross-sectional view of the first base material 21 and the light shielding portion 3 in the polishing step S24. In the polishing step S24, a flattening treatment by polishing, such as chemical mechanical polishing (CMP), is performed, for example. Specifically, by polishing the first film 31a, the second film 32a, and the third film 33a, the light shielding portion 3 including the light shielding section 30 is formed, as illustrated in FIG. 14. The first film 31 is formed by removing a portion of the first film 31a. The second film 32 is formed by removing a portion of the second film 32a. The third film 33 is formed by removing a portion of the third film 33a. Thus, the light shielding section 30 including the first film 31, the second film 32, and the third film 33 is formed.

By polishing the first film 31a, the remainder of the lower surface 313 becomes the first surface 311, and the remainder of the upper surface 314 becomes the second surface 312. By polishing the second film 32a, the remainder of the lower surface 323 becomes the third surface 321, and the remainder of the upper surface 324 becomes the fourth surface 322. By polishing the third film 33a, the remainder of the lower surface 333 becomes the fifth surface 331. Further, by polishing the third film 33a from the upper surface 334 toward the lower surface 333, the sixth surface 332 is formed, which is the smooth surface. When forming the sixth surface 332, a portion of the first base material 21 may or may not be polished along with a portion of the third film 33a. However, as described above, the sixth surface 332 and the upper surface 211 of the first base material 21 preferably configure the flat surface.

Note that the polishing step S24 may be omitted as appropriate. In this case, the light shielding portion 3 is configured by the first film 31a, the second film 32a, and the third film 33a.

As described above, the manufacturing method of the electro-optical device 100 includes the first base material preparation step S10 and the light shielding portion forming step S20. Further, the light shielding portion forming step S20 includes the first film forming step S21, the second film forming step S22, and the third film forming step S23. Furthermore, in the present embodiment, the polishing step S24 is included. According to such a method, the light shielding portion 3 including the first film 31, the second film 32, and the third film 33 can be easily and reliably formed. Thus, according to such a method, the light shielding portion 3 that does not easily peel off from the first base material 21 can be easily and reliably formed. Thus, according to such a method, the light shielding portion 3 that can prevent a deterioration in the light shielding properties of the light shielding portion 3 can be easily and reliably formed.

As described above, in the first base material preparation step S10, the first base material 21 including the recessed portion 219 is prepared. Then, in the light shielding portion forming step S20, the first film 31a, the second film 32a, and the third film 33a are formed in the recessed portion 219. In other words, the light shielding portion 3 is formed by a damascene process. Therefore, the light shielding portion 3 having excellent light shielding properties can be easily and reliably formed, while suppressing the overall thickness of the light shielding portion 3 from becoming excessively thick.

1B. Second Embodiment

A second embodiment will be described. Note that, in each of examples described below, an element having the same function as that of the first embodiment is denoted by the same reference sign used in the description of the first embodiment, and a detailed description thereof will be omitted as appropriate.

Figure 15:
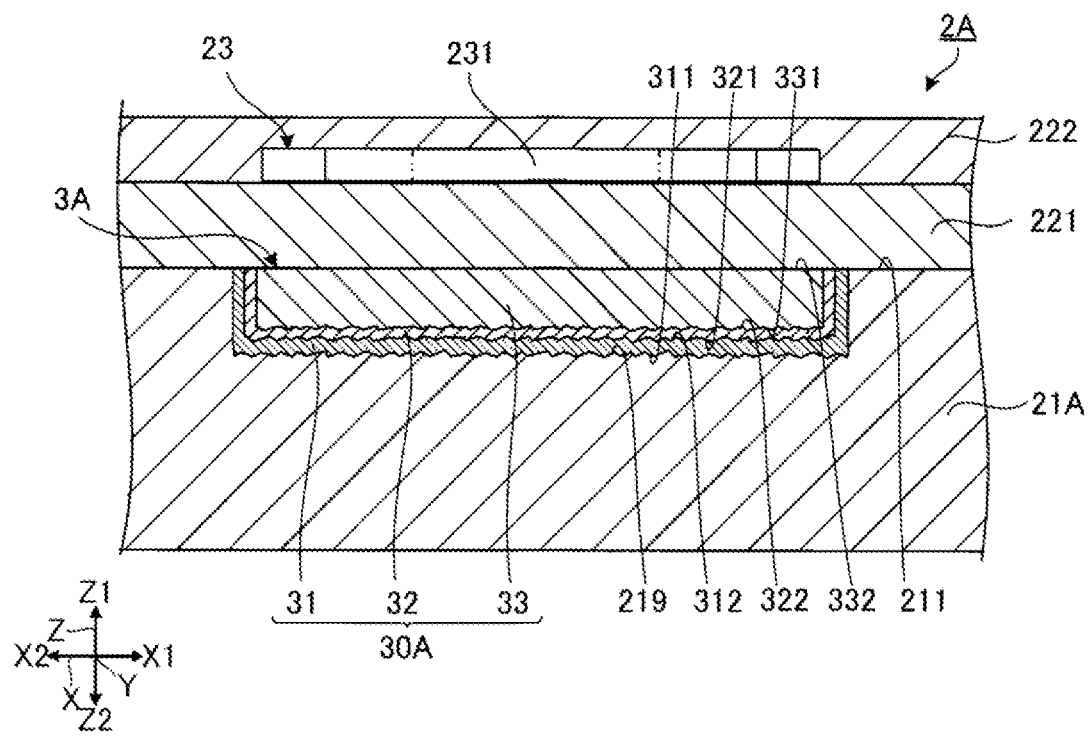
FIG. 15 is a cross-sectional view illustrating a part of an element substrate according to a second embodiment.

FIG. 15 is a cross-sectional view illustrating a part of an element substrate 2A according to the second embodiment. As illustrated in FIG. 15, the element substrate 2A includes a first base material 21A and a light shielding portion 3A. The light shielding portion 3A includes a plurality of light shielding sections 30A, but in FIG. 15, only one of the plurality of light shielding sections 30A is illustrated. The first base material 21A has a configuration similar to that of the first base material 21 of the first embodiment, except for content described below. The light shielding portion 3A has a configuration similar to that of the light shielding portion 3 of the first embodiment, except for content described below.

The surface of the recessed portion 219 of the first base material 21A illustrated in FIG. 15 has surface unevenness. Specifically, the surface unevenness is present on the bottom surface, of the surfaces of the recessed portion 219. On the other hand, the side surfaces of the recessed portion 219 are smooth surfaces. The roughness of the bottom surface of the recessed portion 219 is greater than the roughness of the side surfaces of the recessed portion 219. Specifically, the arithmetic mean roughness of the bottom surface of the recessed portion 219 is greater than the arithmetic mean roughness of the side surfaces of the recessed portion 219. Further, the roughness of the bottom surface of the recessed portion 219 is greater than the roughness of the upper surface 211 of the first base material 21A. More specifically, the arithmetic mean roughness of the bottom surface of the recessed portion 219 is greater than the arithmetic mean roughness of the upper surface 211.

The surface of the recessed portion 219 corresponds to a "first film contact surface". Since the surface of the recessed portion 219 has the surface unevenness, the unevenness on the bottom surface of the recessed portion 219 is transferred to the first surface 311 and the second surface 312, respectively, of the first film 31. Therefore, the unevenness is present on portions of the first surface 311 and the second surface 312 corresponding to the bottom surface of the recessed portion 219. Similarly, the unevenness is present on portions of the third surface 321, the fourth surface 322, and the fifth surface 331 corresponding to the bottom surface of the recessed portion 219. On the other hand, portions of the first surface 311, the second surface 312, the third surface 321, the fourth surface 322, and the fifth surface 331 corresponding to the side surfaces of the recessed portion 219 are smooth.

The roughness of the portion of the second surface 312 corresponding to the bottom surface of the recessed portion 219 is greater than the roughness of the portions of the second surface 312 corresponding to the side surfaces of the recessed portion 219. Specifically, the arithmetic mean roughness of the portion of the second surface 312 corresponding to the bottom surface of the recessed portion 219 is greater than the arithmetic mean roughness of the portions of the second surface 312 corresponding to the side surfaces of the recessed portion 219.

As in the present embodiment, when the unevenness is formed on the second surface 312 of the first film 31 using the unevenness of the surface of the recessed portion 219, the annealing step S212 illustrated in FIG. 8 can be omitted. In other words, the unevenness can be formed on the second surface 312 by a method of transferring the unevenness of the recessed portion 219 to the second surface 312. According to this method, the unevenness can be easily formed on the second surface 312. Then, by causing the second surface 312 to have the unevenness, the adhesion between the first film 31 and the second film 32 can be improved due to the anchoring effect. Thus, the peeling off of the light shielding portion 3A from the first base material 21A can be suppressed.

The method of forming the unevenness on the surface of the recessed portion 219 of the first base material 21A includes the following methods. For example, a polysilicon film having surface unevenness is formed on the recessed portion 219 of the first base material 21A. The film is then etched back. In this way, the unevenness of the polysilicon film is transferred to the surface of the recessed portion 219, and the unevenness is formed on the surface of the recessed portion 219.

Note that both the method of transferring the unevenness of the recessed portion 219 to the second surface 312 and the method of increasing the roughness of the second surface 312 by annealing may be used in combination to form the unevenness on the second surface 312.

Also with the light shielding portion 3A according to the present embodiment described above, excellent adhesion can be achieved, in a similar manner to the above-described first embodiment.

1C. Third Embodiment

A third embodiment will be described. Note that, in each of examples described below, an element having the same function as that of the first embodiment is denoted by the same reference sign used in the description of the first embodiment, and a detailed description thereof will be omitted as appropriate.

Figure 16:
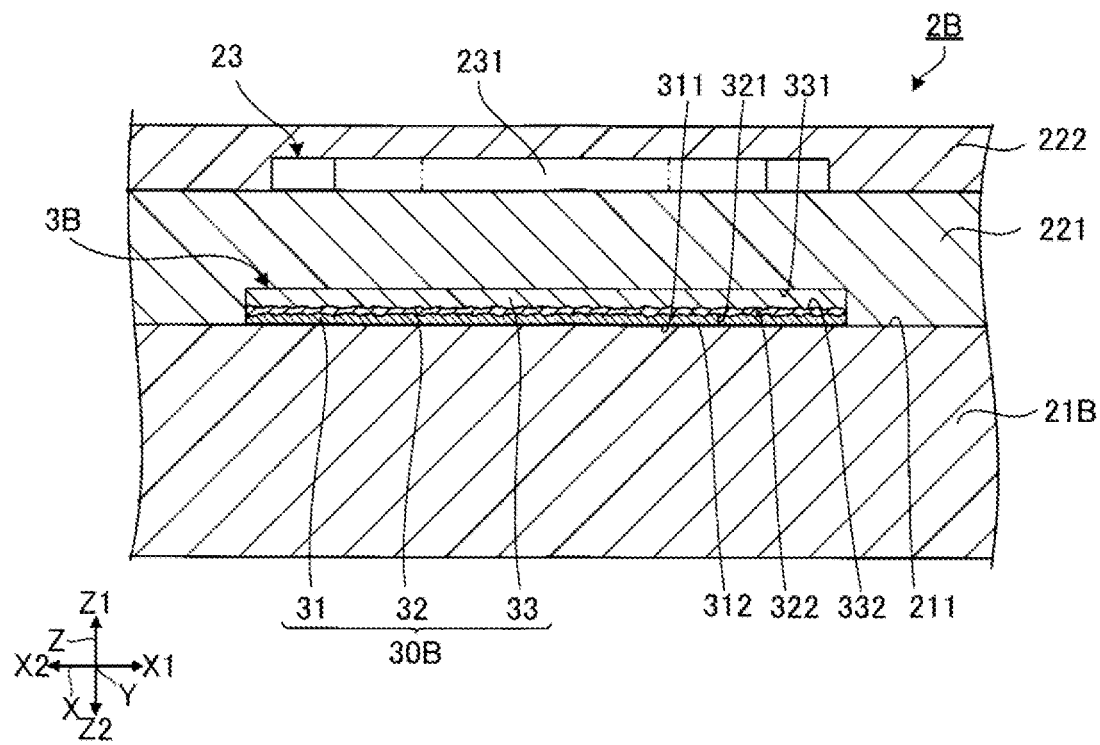
FIG. 16 is a cross-sectional view illustrating a part of an element substrate according to a third embodiment.

FIG. 16 is a cross-sectional view illustrating a part of an element substrate 2B according to the third embodiment. As illustrated in FIG. 16, the element substrate 2B includes a first base material 21B and a light shielding portion 3B. The light shielding portion 3B includes a plurality of light shielding sections 30B, but in FIG. 16, only one of the plurality of light shielding sections 30B is illustrated. The first base material 21B has a configuration similar to that of the first base material 21 of the first embodiment, except for content described below. The light shielding portion 3B has a configuration similar to that of the light shielding portion 3 of the first embodiment, except for content described below.

As illustrated in FIG. 16, the first base material 21B does not include the recessed portion 219 of the first embodiment. The light shielding portion 3B is disposed on the upper surface 211 of the first base material 21B. The light shielding portion 3B protrudes from the first base material 21B toward the transistor 23. The first surface 311 of the first film 31 included in the light shielding portion 3B is in contact with the upper surface 211 of the first base material 21B. The light shielding portion 3B is covered by the insulating film 221. Note that in the example illustrated in FIG. 16, the side surfaces of the light shielding portion 3B do not have unevenness, but the side surfaces of the light shielding portion 3B may have the unevenness.

In a similar manner to the light shielding portion 3 of the first embodiment, the light shielding portion 3B includes the first film 31, the second film 32, and the third film 33. Thus, the second surface 312 of the first film 31 included in the light shielding portion 3B has the unevenness, as in the first embodiment. Thus, the risk of the light shielding portion 3B peeling off from the first base material 21B can be suppressed. As a result, the deterioration in the light shielding properties of the light shielding portion 3B can be suppressed. Further, the second surface 312 of the first film 31 included in the light shielding portion 3B has the unevenness, in a similar manner to the first embodiment. As a result, peeling between the first film 31 and the second film 32 can be suppressed. Thus, the peeling off of the light shielding portion 3B from the first base material 21B can be particularly effectively suppressed.

Also with the light shielding portion 3B according to the present embodiment described above, excellent adhesion can be achieved, in a similar manner to the above-described first embodiment.

1D. Modified Examples

Various modifications can be made to each of the embodiments exemplified above. Specific modes of modification applied to each of the embodiments described above will be exemplified below. Two or more modes freely selected from examples below can be appropriately used in combination as long as mutual contradiction does not arise.

In each of the embodiments described above, an example has been described in which the element substrate 2 includes the "light shielding portion". However, the counter substrate 4 may include the "light shielding portion".

In each of the embodiments described above, an example has been described in which the "light shielding portion" is disposed between the transistor 23 and the first base material 21. Further, an example in which the "base material" is the first base material 21 is described. However, various contact portions, such as the contact portions 271, 272, 273, 274, and 275 may correspond to the "light shielding portion". In other words, the various contact portions may have a configuration including the first film, the second film, and the third film. In this case, a layer that is lower than the "light shielding portion", of the plurality of layers included in the insulating body 22, corresponds to the "base material". Further, the shielding portion 270 may correspond to the "light shielding portion". In this case, the insulating film 222 corresponds to the "base material". Note that, when the contact portion includes the "first film", there is a risk that the resistance of the contact portion may be increased compared to a case in which the contact portion does not include the "first film". Thus, the "light shielding portion" is most preferably disposed so as to inhibit the light incident on the transistor 23.

In the first embodiment described above, the light shielding portion 3 is in contact with the first base material 21, but other layers may be interposed between the light shielding portion 3 and the first base material 21 as long as the other layers do not inhibit the above-described effects of the light shielding portion 3. Note that, in order to prevent the peeling off of the light shielding portion 3 from the first base material 21, the light shielding portion 3 is particularly preferably in contact with the first base material 21. Note that the same also applies to the light shielding portions 3A and 3B. Further, in the embodiments described above, the second film 32 is in contact with the first film 31 and the third film 33. However, other layers may be interposed between the first film 31 and the second film 32, as long as the other layers do not inhibit the above-described effects of the light shielding portion 3. In a similar manner, other layers may be interposed between the second film 32 and the third film 33, as long as the other layers do not inhibit the above-described effects of the light shielding portion 3. Note that, in order to prevent the peeling off of the light shielding portion 3 from the first base material 21, the second film 32 is particularly preferably in contact with the first film 31 and the third film 33.

The plurality of light shielding sections 30 in the above-described embodiments are not coupled to each other, but the plurality of light shielding sections 30 may be coupled to each other.

In the above-described embodiments, a case in which the TFT is used as the transistor is described as an example, but the transistor is not limited to the TFT, and may be, for example, a metal-oxide-semiconductor field-effect transistor (MOSFET), or the like.

In the above-described embodiments, the active matrix type electro-optical device 100 is exemplified, but an electro-optical device is not limited thereto, and the driving method of the electro-optical device may be a passive matrix method or the like, for example.

2. Electronic Apparatus

The electro-optical device 100 can be used for various electronic apparatuses.

Figure 17:
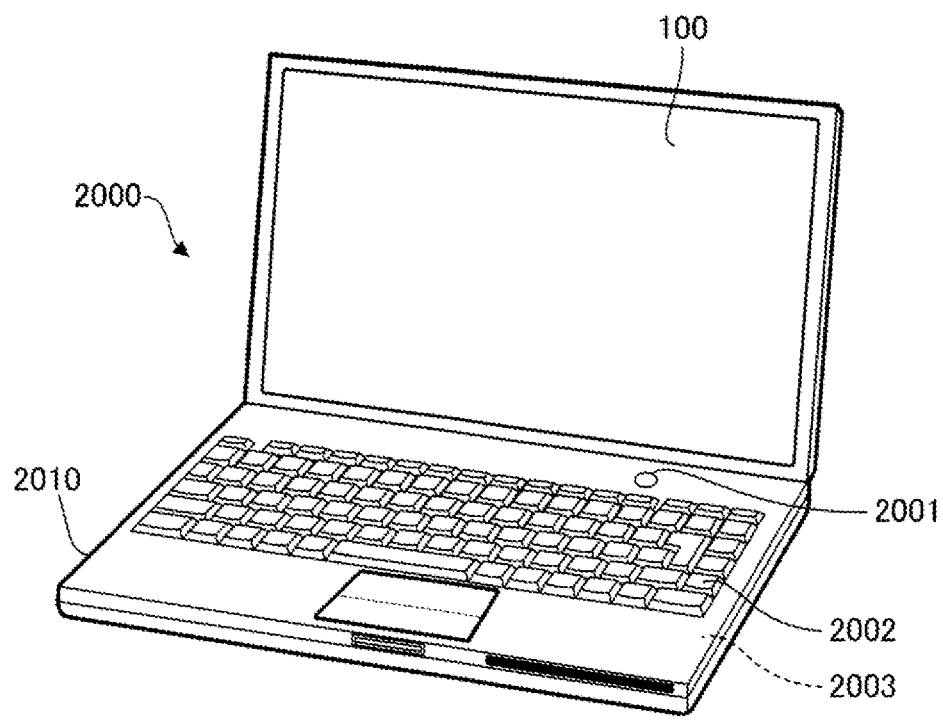
FIG. 17 is a perspective view illustrating a personal computer as an example of an electronic apparatus.

FIG. 17 is a perspective view illustrating a personal computer 200 as an example of an electronic apparatus. The personal computer 2000 includes the electro-optical device 100 that displays various images, a main body portion 2010 in which a power source switch 2001 and a keyboard 2002 are installed, and a control unit 2003. The control unit 2003 includes a processor and a memory, for example, to control the operation of the electro-optical device 100.

Figure 18:
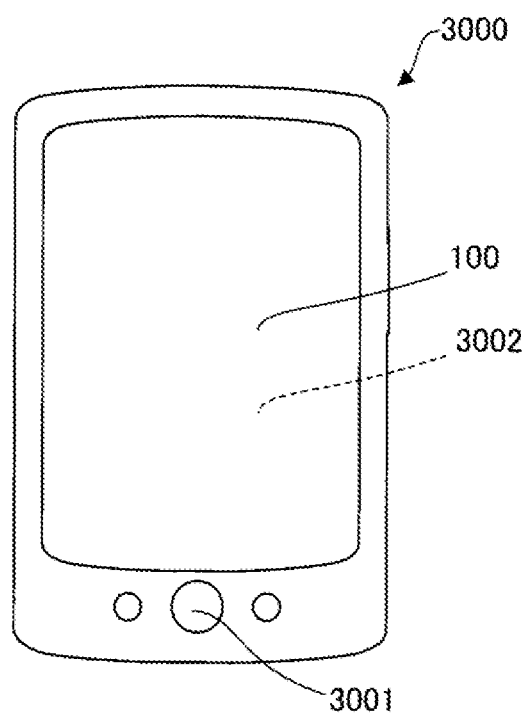
FIG. 18 is a perspective view illustrating a smart phone as an example of the electronic apparatus.

FIG. 18 is a perspective view illustrating a smartphone 3000 as an example of the electronic apparatus. The smartphone 3000 includes an operating button 3001, the electro-optical device 100 that displays various images, and a control unit 3002. Screen content displayed on the electro-optical device 100 is changed in accordance with the operation of the operation button 3001. The control unit 3002 includes a processor and a memory, for example, to control the operation of the electro-optical device 100.

Figure 19:
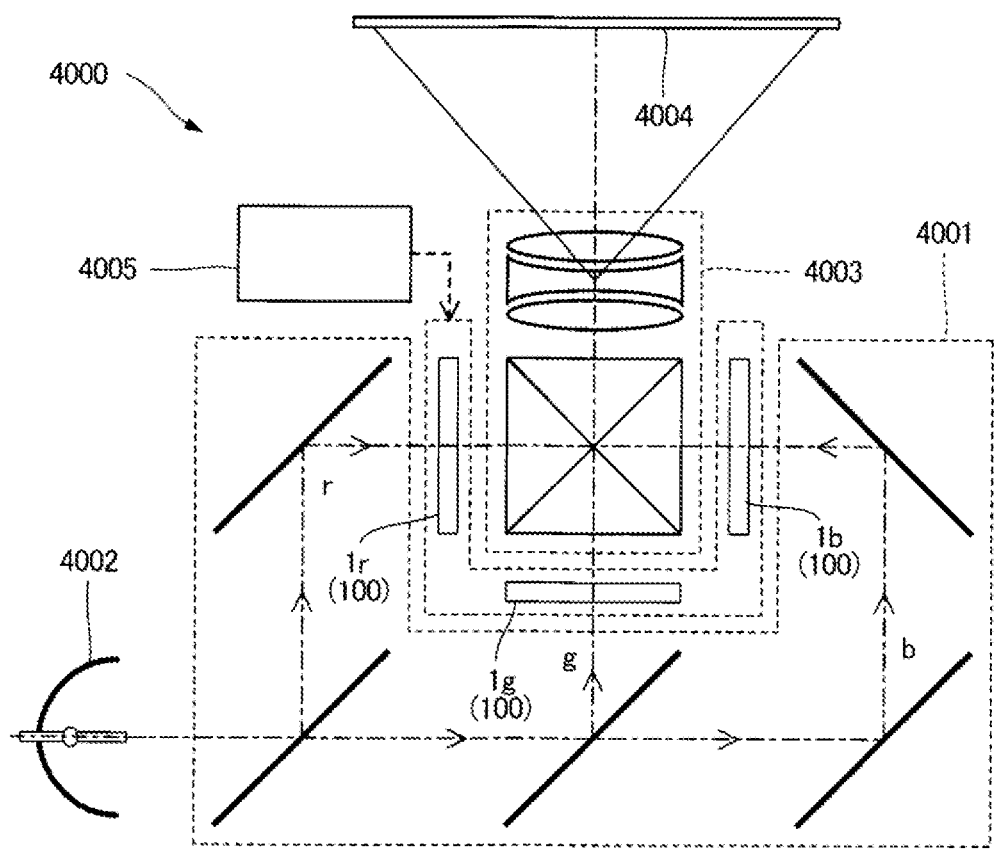
FIG. 19 is a schematic diagram illustrating a projector as an example of the electronic apparatus.

FIG. 19 is a schematic diagram illustrating a projector as an example of the electronic apparatus. A projection-type display device 4000 is a three-plate type projector, for example. An electro-optical device 1*r* is the electro-optical device 100 corresponding to a red display color, an electro-optical device 1*g* is the electro-optical device 100 corresponding to a green display color, and an electro-optical device 1*b* is the electro-optical device 100 corresponding to a blue display color. Specifically, the projection-type display device 4000 includes the three electro-optical devices 1*r*, 1*g*, and 1*b* that respectively correspond to the display colors of red, green, and blue. A control unit 4005 includes a processor and a memory, for example, to control the operation of the electro-optical device 100.

An illumination optical system 4001 supplies a red component r of light emitted from an illumination device 4002, which serves as a light source, to the electro-optical device 1*r*, a green component g of the light to the electro-optical device 1*g*, and a blue component b of the light to the electro-optical device 1*b*. Each of the electro-optical devices 1*r*, 1*g*, and 1*b* functions as an optical modulator, such as a light valve, that modulates respective rays of the colors of light supplied from the illumination optical system 4001 in accordance with a display image. A projection optical system 4003 synthesizes the rays of the light emitted from each of the electro-optical devices 1*r*, 1*g*, and 1*b* and projects the synthesized light onto a projection surface 4004.

The electronic apparatus includes the above-described electro-optical device 100 and the control unit 2003, 3002, or 4005. The electro-optical device 100 has the light shielding portion 3 that does not easily peel off, and therefore has excellent reliability. Thus, the display quality of the personal computer 2000, the smartphone 3000, or the projection-type display apparatus 4000 can be increased.

Note that the electronic apparatus to which the electro-optical device according to the present disclosure is applied is not limited to the exemplified apparatuses, and other examples include a personal digital assistant (PDA), a digital still camera, a television, a video camera, a car navigation device, a display device for in-vehicle use, an electronic organizer, electronic paper, an electronic calculator, a word processor, a workstation, a video telephone, a point of sale (POS) terminal, and the like. Other examples to which the present disclosure is applied further include apparatuses provided with a printer, a scanner, a copier, a video player, or a touch panel.

The present disclosure is described above based on the preferred embodiments, but the present disclosure is not limited to each of the embodiments described above. Further, the configuration of each component of the present disclosure may be replaced with any configuration that achieves the equivalent functions of the above-described embodiments, or any configuration may be added thereto.

Further, in the above description, a liquid crystal device is described as an example of the electro-optical device of the present disclosure, but the electro-optical device of the present disclosure is not limited thereto. For example, the electro-optical device of the present disclosure can also be applied to an image sensor or the like. Further, for example, the present disclosure can also be applied to a display panel using light-emitting elements such as organic electroluminescence (EL), inorganic EL, or light-emitting polymers, in a similar manner to the embodiments described above. Further, the present disclosure can also be applied to an electrophoretic display panel that uses micro capsules each including colored liquid and white particles distributed in the liquid, in a similar manner to the embodiments described above.

What is claimed is:

1. An electro-optical device comprising:
a first substrate including a plurality of pixel electrodes;
a second substrate including a common electrode; and
an electro-optical layer disposed between the plurality of pixel electrodes and the common electrode, optical characteristics of the electro-optical layer changing according to an electric field; wherein
the first substrate or the second substrate includes
a base material composed of an inorganic material and having insulating and transmission properties, and
a light shielding portion having light shielding properties and including a first film containing tungsten silicide, a second film containing titanium nitride or tungsten nitride, and a third film containing tungsten, and
the first film, the second film, and the third film are disposed in this order from the base material,
wherein an upper surface of the base material is aligned with an upper surface of the third film,
the first film includes a first surface in contact with the base material, and a second surface in contact with the second film, and
a roughness of the second surface is greater than a roughness of the first surface.

2. The electro-optical device according to claim 1, wherein
the second surface has unevenness.

3. The electro-optical device according to claim 2, wherein
an arithmetic mean roughness of the second surface is from 1 nm to 10 nm.

4. The electro-optical device according to claim 1, wherein
the second film includes a third surface in contact with the first film, and a fourth surface in contact with the third film, and
the fourth surface has unevenness.

5. The electro-optical device according to claim 1, wherein
the base material includes a first film contact surface in contact with the first film, and
the first film contact surface has unevenness.

6. The electro-optical device according to claim 1, wherein
a pin hole is not present in the third film.

7. The electro-optical device according to claim 1, wherein
a thickness of the first film is thinner than a thickness of the third film, and is greater than a thickness of the second film.

8. The electro-optical device according to claim 1, wherein
the base material includes a recessed portion, and
the light shielding portion is disposed inside the recessed portion.

9. The electro-optical device according to claim 1, wherein
the plurality of pixel electrodes include a first pixel electrode and a second pixel electrode;
the first substrate further includes a first transistor electrically coupled to the first pixel electrode and a second transistor electrically coupled to the second pixel electrode,
the light shielding portion includes a first light shielding section disposed between the base material and the first transistor and a second light shielding section disposed between the base material and the second transistor; and
each of the first light shielding section and the second light shielding section includes the first film, the second film, and the third film.

10. An electronic apparatus comprising:
the electro-optical device according to claim 1; and
a control unit configured to control operation of the electro-optical device.

11. A manufacturing method of an electro-optical device that includes a first substrate including a plurality of pixel electrodes, a second substrate including a common electrode, and an electro-optical layer disposed between the plurality of pixel electrodes and the common electrode, optical characteristics of the electro-optical layer changing according to an electric field, the method comprising:
in manufacturing of the first substrate or the second substrate,
preparing a base material composed of an inorganic material and having insulating and transmission properties, and
forming a light shielding portion having light shielding properties and including a first film containing tungsten silicide, a second film containing titanium nitride or tungsten nitride, and a third film containing tungsten, wherein
the formation of the light shielding portion includes
forming the first film at the base material,
forming the second film at the first film, and
forming the third film at the second film,
wherein an upper surface of the base material is aligned with an upper surface of the third film,
the first film includes a first surface in contact with the base material, and a second surface in contact with the second film, and
a roughness of the second surface is greater than a roughness of the first surface.

12. The manufacturing method of the electro-optical device according to claim 11, wherein
the formation of the first film includes
processing for forming, at the base material, a silicide film containing tungsten silicide, and
processing for forming the first film by annealing the silicide film.

13. The method of manufacturing the electro-optical device according to claim 11, wherein
the preparation of the base material includes preparing the base material including a recessed portion, and
the formation of the light shielding portion includes forming the first film, the second film, and the third film inside the recessed portion.

* * * * *